United States Patent
Sakamoto

(10) Patent No.: US 6,285,533 B1
(45) Date of Patent: Sep. 4, 2001

(54) METHOD OF AND APPARATUS FOR CONTROLLING THE OPERATION OF VARIABLE SPEED GEARING

(75) Inventor: Shigeru Sakamoto, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/459,572

(22) Filed: Dec. 13, 1999

(51) Int. Cl.⁷ ...................................................... H02H 5/04
(52) U.S. Cl. .................................. 361/31; 361/23; 361/87
(58) Field of Search ........................... 361/23, 31, 28–29, 361/62–63, 67, 78, 87; 318/798, 799, 806, 818, 822

(56) References Cited

U.S. PATENT DOCUMENTS

| | | | |
|---|---|---|---|
| 4,780,656 | * | 10/1988 | Mitchell ................................ 318/798 |
| 4,812,729 | * | 3/1989 | Ito et al. ................................ 318/732 |
| 4,952,852 | * | 8/1990 | Bando et al. .......................... 318/140 |
| 5,306,998 | * | 4/1994 | Nakamura ............................ 318/806 |
| 5,561,358 | * | 10/1996 | Kuwabara et al. ................... 318/799 |

FOREIGN PATENT DOCUMENTS 8-9692    1/1996   (JP) .

* cited by examiner

Primary Examiner—Michael J. Sherry
(74) Attorney, Agent, or Firm—Oblon, Spivak, McClelland, Maier & Neustadt, P.C.

(57) ABSTRACT

If an excess current is detected after the current in the secondary circuit of an induction generator-motor has exceeded a preset value, it is determined that a fault has occurred in the transmission line, provided that the current at the neutral point of a main transformer has exceeded a preset value. In this case, the operation of the induction generator-motor is continued. If no excess current is detected, it is determined that a fault has occurred in the secondary circuit of the induction generator-motor, provided that the current at the neutral point of the main transformer has not exceeded the preset value. In this case, the operation of the induction generator-motor is stopped.

15 Claims, 9 Drawing Sheets

METHOD OF AND APPARATUS FOR CONTROLLING THE OPERATION OF VARIABLE SPEED GEARING

BACKGROUND OF THE INVENTION

This invention relates to a method of and apparatus for controlling the operation of a variable speed gearing capable of preventing fluctuations in the power on a transmission line, when a fault, such as a one-line ground or a three-line ground, has occurred in the transmission line, and thereby improving the reliability of power generation facilities.

FIG. 8 schematically shows an example of an operation controller for a variable speed gearing, such as an induction generator-motor.

In FIG. 8, the primary circuit of an induction generator-motor 5 is connected to a transmission line 1 and a transmission line 2 via breakers CB11, CB12 and breakers CB21, CB22, a breaker CB3, a main transformer 3, disconnectors DS1, DS2, and a parallel breaker 4 in that order.

An exciting current (secondary exciting current) to the secondary circuit 10 of the induction generator-motor 5 is produced in such a manner that the alternating current on the transmission lines 1 and 2 inputted via an exciting power supply breaker 6 and an exciting transformer 7 is converted into a direct current by a power rectifier 8 in the presence of a power rectifier control signal 13 from a variable speed controller 11 and then the direct current is converted into an alternating current of variable frequency by a power inverter 9 in the presence of a power inverter control signal 14 from the variable speed controller 11.

The application of the secondary exciting current enables the induction generator-motor 5 to be operated at variable speed in synchronization with the alternating current on the transmission lines 1 and 2.

On the other hand, when a one-line ground or a three-line ground has occurred at a fault point 19 on the transmission line 2, the induction generator-motor 5 supplies a fault current to the transmission-line fault point 19. As a result, the fault current flows in the primary circuit of the induction generator-motor 5. The fault current then produces electromotive force in the secondary winding of the induction generator-motor 5, resulting in excess current flowing in the secondary circuit of the induction generator-motor 5.

FIG. 9 is a waveform diagram to help explain an example of excess current in the secondary circuit 10 of the induction generator-motor 5 when an fault has occurred in the transmission line.

In FIG. 9, the current waveform 21 of the secondary circuit 10, which is generally of a three-phase balanced current, varies with time in the direction of the arrow shown by t.

On the other hand, when a fault has occurred in the transmission line 2, the current in the secondary circuit 10 of the induction generator-motor 5 increases, because the balance of the three-phase current is lost at the transmission line fault point 22 due to the induced voltage in the secondary circuit 10 caused by the fault current supplied from the induction generator-motor 5.

The current in the secondary circuit 10 of the induction generator-motor 5 is sensed by a secondary current sensor 15 provided for each of the three phases of the secondary circuit 10. Excess current is sensed, provided that an excess current sensor 16 senses that the current has exceeded a preset value. The excess current sensor 16 starts to operate at an excess current sensing point 23.

Then, when the excess current sensor 16 has started to operate, the variable speed controller 11 judges that it is impossible to continue the operation of the induction generator-motor 5 and outputs a generator trip signal 20 to a generator controller 12, thereby tripping the parallel breaker 4 and exciting power supply breaker 6, which not only disconnects the induction generator-motor 5 from the transmission lines 1 and 2 but also stops the operation of the induction generator-motor 5.

In FIG. 9, the disconnected state of the induction generator-motor 5 is shown at the generator trip point 24.

On the other hand, when a transmission line fault has occurred, a transmission protective device 17 and a transmission protective device 18 provided in the transmission line 2 operate, closing the breakers CB21, CB22 in the transmission line 2 again, restoring the transmission line 2 to normal conditions.

At this time, when the ground fault at the transmission line fault point 19 is transient and lasts for a short time, the re-closing of the circuit is successful, restoring the transmission line 2 to the state before the fault occurred. When the ground fault at the transmission line fault point 19 has lasted for a long time, the re-closed circuit is broken finally, tripping the breakers CB21, CB22 at both ends of the transmission line fault point 19 to disconnect the fault point 19 from the transmission line 2, which keeps the transmission line 2 in good condition.

With such a method, when excess current in the secondary circuit 10 of the induction generator-motor 5 has been sensed, it cannot be judged whether the fault has occurred in the transmission line 2 or in the secondary circuit 10 of the induction generator-motor 5. For this reason, the operation of the induction generator-motor 5 is stopped in the presence of excess current in the secondary circuit 10, although the fault in the transmission line 2 might be remedied.

As described above, with a conventional variable speed gearing operation controller, when a fault, such as a one-line ground or a three-line ground, has occurred at the fault point 19 in the transmission line 2, the transmission line protective devices 17 and 18 provided on the transmission line 2 side operate, restoring the transmission line 2 to normal conditions by the re-closing of the circuit or by the final cutoff of the re-closed circuit, which stops the operation of the induction generator-motor 5 in the presence of excess current in the secondary circuit 10, although the fault in the transmission line might be remedied.

Namely, with such a method, although the induction generator-motor 5 itself has not gone wrong, the operation of the induction generator-motor 5 is stopped. As a result, the induction generator-motor 5, which may be operated without being disconnected from the transmission line, is disconnected, preventing the supply of power. Furthermore, the power cannot be supplied to the power system which is short of power due to the fault in the transmission line 2, causing fluctuations in the power on the transmission line 2.

BRIEF SUMMARY OF THE INVENTION

The object of the present invention is to provide a method of and apparatus for controlling the operation of a variable speed gearing which, when a fault, such as a one-line ground or a three-line ground, has occurred in a transmission line, not only maintains the operating state of the induction generator-motor and causes the induction generator-motor to operate so as to compensate for the power shortage at the time of transmission line fault, thereby preventing the power on the transmission line from fluctuating, but also improves the reliability of the power generation facilities.

According to a first aspect of the present invention, there is provided a method of controlling the operation of a variable speed gearing, comprising: the step of causing a power rectifier to convert an alternating current of a transmission line inputted via an exciting transformer into a direct current in the presence of a power rectifier control signal from a variable speed controller; the step of causing a power inverter to convert the direct current into an alternating current of variable frequency in the presence of a power inverter control signal from the variable speed controller to produce a secondary exciting current; the step of supplying the secondary exciting current to the secondary circuit of an induction generator-motor whose primary circuit is connected to the transmission line via at least a main transformer and thereby operating the induction generator-motor at variable speed in synchronization with the alternating current on the transmission line; and the step of, when excess current is sensed, provided that the current value in the secondary circuit of the induction generator-motor has exceeded a preset value, judging that excess current is in the secondary circuit of the induction generator-motor due to a fault in the transmission line, if excess current has been sensed, provided that the current value at the neutral point of the main transformer has exceeded a preset value, and continuing the operation of the induction generator-motor, or judging that a fault has occurred in the secondary circuit of the induction generator-motor, if excess current has not been sensed, provided that the current value at the neutral point of the main transformer has not exceeded the preset value, and stopping the operation of the induction generator-motor.

In the method of controlling the operation of a variable speed gearing according to the first aspect, when excess current is sensed, provided that the current value in the secondary circuit of the induction generator-motor has exceeded the preset value, it is judged that excess current is in the secondary circuit of the induction generator-motor due to a fault in the transmission line, if excess current has been sensed, provided that the current value at the neutral point of the main transformer has exceeded a preset value, and the operation of the induction generator-motor is continued, or it is judged that a fault has occurred in the secondary circuit of the induction generator-motor, if excess current has not been sensed, provided that the current value at the neutral point of the main transformer has not exceeded the preset value, and the operation of the induction generator-motor is stopped.

Therefore, even when a fault, such as a one-line ground or a three-line ground, has occurred in the transmission line, the induction generator-motor can be operated in such a manner that the operating state of the induction generator-motor is maintained and the power shortage at the time of transmission line fault is compensated for. As a result, the power on the transmission line is prevented from fluctuating and the reliability of the power generation facilities is improved.

Since a fault in the transmission line can be sensed directly, it is possible to make the accuracy and probability of sensing very high.

According to a second aspect of the present invention, there is provided a method of controlling the operation of a variable speed gearing, comprising: the step of causing a power rectifier to convert an alternating current of a transmission line inputted via an exciting transformer into a direct current in the presence of a power rectifier control signal from a variable speed controller; the step of causing a power inverter to convert the direct current into an alternating current of variable frequency in the presence of a power inverter control signal from the variable speed controller to produce a secondary exciting current; the step of supplying the secondary exciting current to the secondary circuit of an induction generator-motor whose primary circuit is connected to the transmission line via at least a main transformer and thereby operating the induction generator-motor at variable speed in synchronization with the alternating current on the transmission line; and the step of, when excess current is sensed, provided that the current value in the secondary circuit of the induction generator-motor has exceeded a preset value, judging that excess current is in the secondary circuit of the induction generator-motor due to a fault in the transmission line, if excess current has been sensed, provided that the current value in the primary circuit of the induction generator-motor has exceeded a preset value, and continuing the operation of the induction generator-motor, or judging that a fault has occurred in the secondary circuit of the induction generator-motor, if excess current has not been sensed, provided that the current value in the primary circuit of the induction generator-motor has not exceeded the preset value, and stopping the operation of the induction generator-motor.

In the method of controlling the operation of a variable speed gearing according to the second aspect, when excess current is sensed, provided that the current value in the secondary circuit of the induction generator-motor has exceeded the preset value, it is judged that excess current is in the secondary circuit of the induction generator-motor due to a fault in the transmission line, if excess current has been sensed, provided that the current value in the primary circuit of the induction generator-motor has exceeded a preset value, and the operation of the induction generator-motor is continued, or it is judged that a fault has occurred in the secondary circuit of the induction generator-motor, if excess current has not been sensed, provided that the current value in the primary circuit of the induction generator-motor has not exceeded the preset value, and the operation of the induction generator-motor is stopped.

Therefore, even when a fault, such as a one-line ground or a three-line ground, has occurred in the transmission line, the induction generator-motor can be operated in such a manner that the operating state of the induction generator-motor is maintained and the power shortage at the time of transmission line fault is compensated for. As a result, the power on the transmission line is prevented from fluctuating and the reliability of the power generation facilities is improved.

Since a fault in the transmission line can be sensed indirectly by using the existing facilities, there is no need to additionally prepare special facilities for sensing a fault in the transmission line.

According to a third aspect of the present invention, there is provided a method of controlling the operation of a variable speed gearing, comprising: the step of causing a power rectifier to convert an alternating current of a transmission line inputted via an exciting transformer into a direct current in the presence of a power rectifier control signal from a variable speed controller; the step of causing a power inverter to convert the direct current into an alternating current of variable frequency in the presence of a power inverter control signal from the variable speed controller to produce a secondary exciting current; the step of supplying the secondary exciting current to the secondary circuit of an induction generator-motor whose primary circuit is connected to the transmission line via at least a main transformer and thereby operating the induction generator-motor at variable speed in synchronization with the alternating current on the transmission line; the step of cutting off the current in the secondary circuit of the induction generator-motor by blocking the power inverter control signal to the power inverter after excess current has been sensed, provided that the current value in the secondary circuit of the induction generator-motor has exceeded a preset value; the step of continuing the operation of the induction generator-motor by reactivating the power inverter control signal to the power inverter by restart, if current attenuation has been sensed, provided that the current in the secondary circuit of the induction generator-motor has dropped below a preset value; and the step of judging that it is impossible to remove a fault in the induction generator-motor or in the transmission line, if a protective element other than the excess current sensing element in the secondary circuit of the induction generator-motor has operated during the restart, or if the number of times the restart was made has exceeded a preset value, and stopping the operation of the induction generator-motor.

In the method of controlling the operation of a variable speed gearing according to the third aspect, the current in the secondary circuit of the induction generator-motor is cut off by blocking the power inverter control signal to the power inverter after excess current has been sensed, provided that the current value in the secondary circuit of the induction generator-motor has exceeded a preset value. The operation of the induction generator-motor is continued by reactivating the power inverter control signal to the power inverter by restart, if current attenuation has been sensed, provided that the current in the secondary circuit of the induction generator-motor has dropped below a preset value. If a protective element other than the excess current sensing element in the secondary circuit of the induction generator-motor has operated during the restart, or if the number of times the restart was made has exceeded a preset value, it is judged that it is impossible to remove a fault in the induction generator-motor or in the transmission line and the operation of the induction generator-motor is stopped.

Therefore, even when a fault, such as a one-line ground or a three-line ground, has occurred in the transmission line, the induction generator-motor can be operated in such a manner that the operating state of the induction generator-motor is maintained and the power shortage at the time of transmission line fault is compensated for. As a result, the power on the transmission line is prevented from fluctuating and the reliability of the power generation facilities is improved.

Since a predictive judgment technique is used and the control signal of the power inverter has only to be activated and deactivated, this improves the response characteristic and shortens the time required to restore the transmission line to normal conditions when a fault has occurred in the transmission line.

Furthermore, when it has been judged that the fault in the induction generator-motor or in the transmission line cannot be removed and the operation of the induction generator-motor is stopped, useless control of the current in the secondary circuit of the induction generator-motor is minimized, contributing to the reliability of the system.

According to a fourth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the current value has exceeded a preset value; ground excess current sensing means for sensing current at the neutral point of the main transformer and then sensing excess current, provided that the current value has exceeded a preset value; judging means for judging whether a fault occurred in the transmission line is allowed to continue or remedied, on the basis of the result of sensing excess current at the ground excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the fourth aspect, the secondary circuit excess current sensing means senses that the current value in the secondary circuit of the induction generator-motor has exceeded the preset value. The ground excess current sensing means senses that the current value at the neutral point of the main transformer has exceeded the preset value. Then, the judging means judges whether a fault occurred in the transmission line is allowed to continue or remedied, on the basis of the result of sensing excess current at the ground excess current sensing means. On the basis of the result of sensing excess current at the secondary circuit excess current sensing means and the result of judgment at the judging means, the control means conducts or cuts off the current in the secondary circuit of the induction generator-motor by activating or deactivating the power inverter control signal.

Therefore, the apparatus according to the fourth aspect operates in the same manner as and produces the same effect as the first aspect.

According to a fifth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the current value has exceeded a preset value; generator excess current sensing means for sensing current in the primary circuit of the induction generator-motor and then sensing excess current, provided that the current value has exceeded a preset value; judging means for judging whether a fault occurred in the transmission line is allowed to continue or remedied, on the basis of the result of sensing excess current at the generator excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the fifth aspect, the secondary circuit excess current sensing means senses that the current value in the secondary circuit of the induction generator-motor has exceeded the preset value. The generator excess current sensing means senses that the current value in the primary circuit of the induction generator-motor has exceeded the preset value. Then, the judging means judges whether a fault occurred in the transmission line is allowed to continue or remedied, on the basis of the result of sensing excess current at the generator excess current sensing means. On the basis of the result of sensing excess current at the secondary circuit excess current sensing means and the result of judgment at the judging means, the control means conducts or cuts off the current in the secondary circuit of the induction generator-motor by activating or deactivating the power inverter control signal.

Therefore, the apparatus according to the fifth aspect operates in the same manner as and produces the same effect as the second aspect.

According to a sixth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the current value has exceeded a preset value; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, and the result of judgment at the fault judging means.

With the apparatus for controlling the operation of a variable speed gearing according to the sixth aspect, the secondary circuit excess current sensing means senses that the current value in the secondary circuit of the induction generator-motor has exceeded the preset value. The current attenuation sensing means senses that the current value in the secondary circuit of the induction generator-motor has dropped below the preset value. The fault judging means judges that a fault has occurred in the induction generator-motor, provided that a protective element other than the secondary circuit excess current sensing means is in operation. On the basis of the result of sensing excess current at the secondary circuit excess current sensing means, the result of sensing current attenuation at the current attenuation sensing means, and the result of judgment at the judging means, the control means conducts or cuts off the current in the secondary circuit of the induction generator-motor by activating or deactivating the power inverter control signal.

Therefore, the apparatus according to the sixth aspect operates in the same manner as and produces the same effect as the third aspect.

According to a seventh aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the current value has exceeded a preset value; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; restart execute judging means for storing the number of restarts of current in the secondary circuit of the induction generator-motor and judging that it is impossible to remedy the fault, provided that the number of restarts has exceeded a preset value; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, the result of judgment at the fault judging means, and the result of judgment at the restart execute judging means.

With the apparatus for controlling the operation of a variable speed gearing according to the seventh aspect, the secondary circuit excess current sensing means senses that the current value in the secondary circuit of the induction generator-motor has exceeded the preset value. The current attenuation sensing means senses that the current value in the secondary circuit of the induction generator-motor has dropped below the preset value. The fault judging means judges that a fault has occurred in the induction generator-motor, provided that a protective element other than the secondary circuit excess current sensing means is in operation. The restart execute judging means judges that it is impossible to remedy the fault, provided that the number of restarts of current in the secondary circuit of the induction generator-motor has exceeded the preset value. On the basis of the result of sensing excess current at the secondary circuit excess current sensing means, the result of sensing current attenuation at the current attenuation sensing means, the result of judgment at restart execute judging means, and the result of judgment at the judging means, the control means conducts or cuts off the current in the secondary circuit of the induction generator-motor by activating or deactivating the power inverter control signal.

According to an eighth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the rate of change of the current value has exceeded a preset rate of change; ground excess current sensing means for sensing current at the neutral point of the main transformer and then sensing excess current, provided that the current value has exceeded a preset value; judging means for judging whether a fault occurred in the transmission line is allowed to continue or remedied, on the basis of the result of sensing excess current at the ground excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the eighth aspect, since the secondary circuit excess current sensing means senses excess current, provided that the rate of change of the current value in the secondary circuit of the induction generator-motor has exceeded the preset rate of change, the response characteristic can be improved more than in the fourth aspect.

According to a ninth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the rate of change of the current value has exceeded a preset rate of change; generator excess current sensing means for sensing current in the primary circuit of the induction generator-motor and then sensing excess current, provided that the current value has exceeded a preset value; judging means for judging whether a fault occurred in the transmission line is allowed to continue or remedied, on the basis of the result of sensing excess current at the generator excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the ninth aspect, since the secondary circuit excess current sensing means senses excess current, provided that the rate of change of the current value in the secondary circuit of the induction generator-motor has exceeded the preset rate of change, the response characteristic can be improved more than in the fifth aspect.

According to a tenth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the rate of change of the current value has exceeded a preset rate of change; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, and the result of judgment at the fault judging means.

With the apparatus for controlling the operation of a variable speed gearing according to the tenth aspect, since the secondary circuit excess current sensing means senses excess current, provided that the rate of change of the current value in the secondary circuit of the induction generator-motor has exceeded the preset rate of change, the response characteristic can be improved more than in the sixth aspect.

According to an eleventh aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for sensing the current in the secondary circuit of the induction generator-motor and then sensing excess current, provided that the rate of change of the current value has exceeded a preset rate of change; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; restart execute judging means for storing the number of restarts of current in the secondary circuit of the induction generator-motor and judging that it is impossible to remedy the fault, provided that the number of restarts has exceeded a preset value; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, the result of judgment at the fault judging means, and the result of judgment at the restart execute judging means.

With the apparatus for controlling the operation of a variable speed gearing according to the eleventh aspect, since the secondary circuit excess current sensing means senses excess current, provided that the rate of change of the current value in the secondary circuit of the induction generator-motor has exceeded the preset rate of change, the response characteristic can be improved more than in the seventh aspect.

According to a twelfth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for converting a conversion instruction value signal to the power inverter into a signal corresponding to the secondary current in the secondary circuit of the induction generator-motor, comparing the value of the converted signal with the effective current value in the secondary circuit of the induction generator-motor, and then sensing excess current, provided that the deviation of the value of the converted signal from the effective current value has exceeded a preset value; ground excess current sensing means for sensing current at the neutral point of the main transformer and then sensing excess current, provided that the current value has exceeded a preset value; judging means for judging whether a fault occurred in the transmission line is allowed to continue or remedied, on the basis of the result of sensing excess current at the ground excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the twelfth aspect, since the secondary circuit excess current sensing means senses excess current, provided that the deviation of the signal value obtained by converting the conversion instruction value signal to the power inverter into a signal corresponding to the secondary current in the secondary circuit of the induction generator-motor from the effective current value in the secondary circuit of the induction generator-motor has exceeded the preset value, a fault in the transmission can be sensed faster and more accurately than in the fourth aspect.

According to a thirteenth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for converting a conversion instruction value signal to the power inverter into a signal corresponding to the secondary current in the secondary circuit of the induction generator-motor, comparing the value of the converted signal with the effective current value in the secondary circuit of the induction generator-motor, and then sensing excess current, provided that the deviation of the value of the converted signal from the effective current value has exceeded a preset value; generator excess current sensing means for sensing current in the primary circuit of the induction generator-motor and then sensing excess current, provided that the current value has exceeded a preset value; judging means for judging whether a fault occurred in the transmission line is allowed to continue or remedied, on the basis of the result of sensing excess current at the generator excess current sensing means; and control means for conducting or cutting off the current in the secondary circuit of the induction generator-motor by activating or deactivating a power inverter control signal from the variable speed controller on the basis of the result of sensing excess current at the secondary circuit excess current sensing means and the result of judgment at the judging means.

With the apparatus for controlling the operation of a variable speed gearing according to the thirteenth aspect, since the secondary circuit excess current sensing means senses excess current, provided that the deviation of the signal value obtained by converting the conversion instruction value signal to the power inverter into a signal corresponding to the secondary current in the secondary circuit of the induction generator-motor from the effective current value in the secondary circuit of the induction generator-motor has exceeded the preset value, a fault in the transmission can be sensed faster and more accurately than in the fifth aspect.

According to a fourteenth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for converting a conversion instruction value signal to the power inverter into a signal corresponding to the secondary current in the secondary circuit of the induction generator-motor, comparing the value of the converted signal with the effective current value in the secondary circuit of the induction generator-motor, and then sensing excess current, provided that the deviation of the value of the converted signal from the effective current value has exceeded a preset value; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, and the result of judgment at the fault judging means.

With the apparatus for controlling the operation of a variable speed gearing according to the fourteenth aspect, since the secondary circuit excess current sensing means senses excess current, provided that the deviation of the signal value obtained by converting the conversion instruction value signal to the power inverter into a signal corresponding to the secondary current in the secondary circuit of the induction generator-motor from the effective current value in the secondary circuit of the induction generator-motor has exceeded the preset value, a fault in the transmission can be sensed faster and more accurately than in the sixth aspect.

According to a fifteenth aspect of the present invention, there is provided an apparatus for controlling the operation of a variable speed gearing, comprising: a power rectifier for converting an alternating current of a transmission line inputted via an exciting transformer into a direct current in the presence of a power rectifier control signal from a variable speed controller; a power inverter for converting the direct current into an alternating current of variable frequency in the presence of a power inverter control signal from the variable speed controller to produce a secondary exciting current; means for supplying the secondary exciting current to the secondary circuit of an induction generator-motor whose primary circuit is connected to the transmission line via at least a main transformer and thereby operating the induction generator-motor at variable speed in synchronization with the alternating current on the transmission line; secondary circuit excess current sensing means for converting a conversion instruction value signal to the power inverter into a signal corresponding to the secondary current in the secondary circuit of the induction generator-motor, comparing the value of the converted signal with the effective current value in the secondary circuit of the induction generator-motor, and then sensing excess current, provided that the deviation of the value of the converted signal from the effective current value has exceeded a preset value; current attenuation sensing means for sensing current attenuation, provided that the current value in the secondary circuit of the induction generator-motor has dropped below a preset value; fault judging means for judging that a fault has occurred in the induction generator-motor, provided that a protective element other than the secondary circuit excess current sensing means is in operation; restart execute judging means for storing the number of restarts of current in the secondary circuit of the induction generator-motor and judging that it is impossible to remedy the fault, provided that the number of restarts has exceeded a preset value; and control means for conducting or cutting off the current in the secondary circuit of the induction generator-motor by activating or deactivating a power inverter control signal from the variable speed controller on the basis of the result of sensing excess current at the secondary circuit excess current sensing means, the result of sensing current attenuation at the current attenuation sensing means, the result of judgment at the fault judging means, and the result of judgment at the restart execute judging means.

With the apparatus for controlling the operation of a variable speed gearing according to the fifteenth aspect, since the secondary circuit excess current sensing means senses excess current, provided that the deviation of the signal value obtained by converting the conversion instruction value signal to the power inverter into a signal corresponding to the secondary current in the secondary circuit of the induction generator-motor from the effective current value in the secondary circuit of the induction generator-motor has exceeded the preset value, a fault in the transmission can be sensed faster and more accurately than in the seventh aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring the accompanying drawings, embodiments of the present invention will be described.
(First Embodiment)

Figure 1:
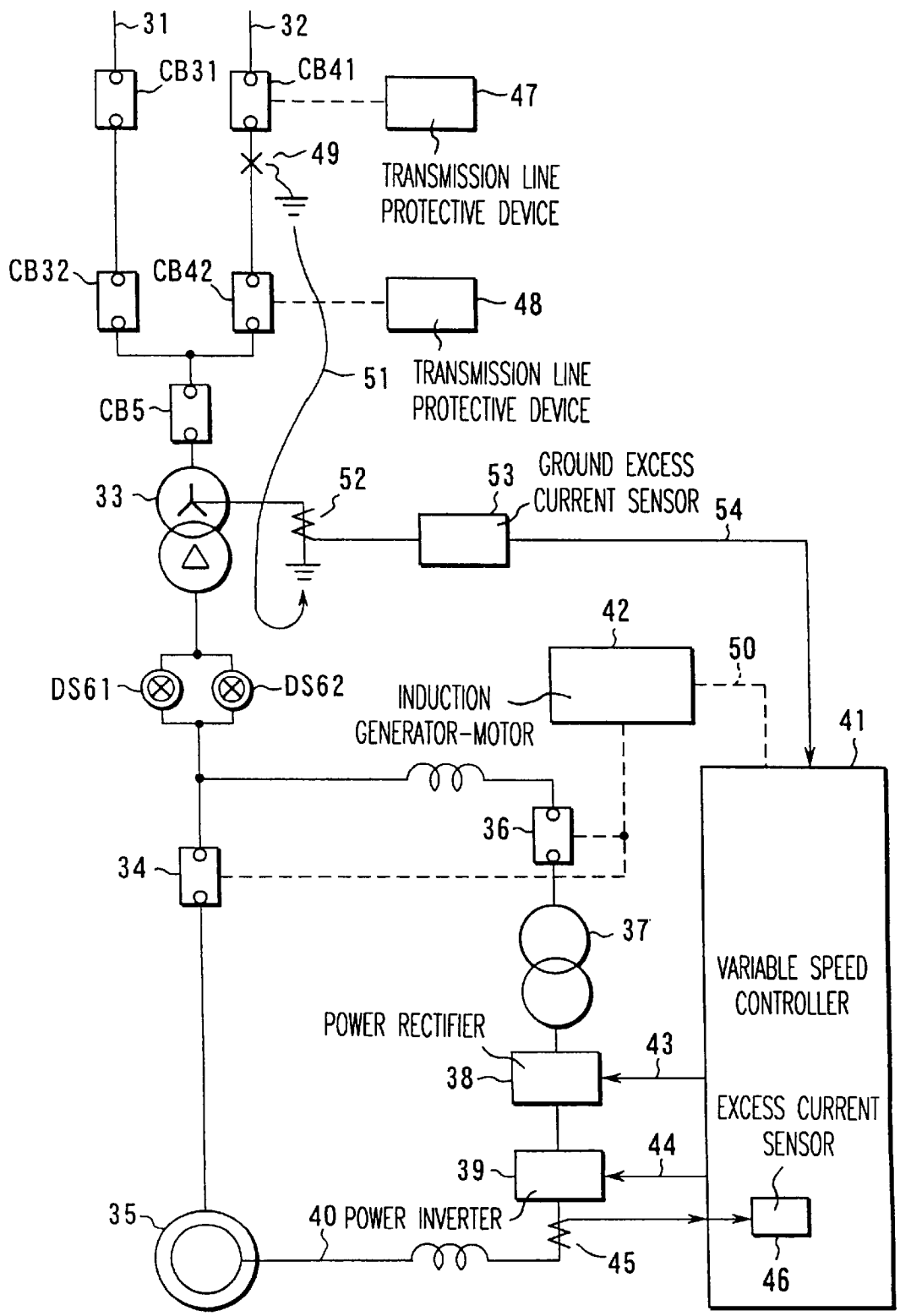
FIG. 1 is a block diagram of an operation controller for a variable speed gearing according to a first embodiment of the present invention.

FIG. 1 schematically shows an example of the configuration of an operation controller for a variable speed gearing according to a first embodiment of the present invention.

In FIG. 1, the primary circuit of an induction generator-motor 35 is connected to a transmission line 31 and a transmission line 32 via breakers CB31, CB32 and breakers CB41, CB42, a breaker CB5, a main transformer 33, disconnectors DS61, DS62, and a parallel breaker 34 in that order.

An exciting current (secondary exciting current) to the secondary circuit 40 of the induction generator-motor 35 is produced in such a manner that the alternating current on the transmission lines 31 and 32 inputted via an exciting power supply breaker 36 and an exciting transformer 37 is converted into a direct current by a power rectifier 38 in the presence of a power rectifier control signal 43 from a variable speed controller 41 and then the direct current is converted into an alternating current of variable frequency by a power inverter 39 in the presence of a power inverter control signal 44 from the variable speed controller 41.

The application of the secondary exciting current enables the induction generator-motor 35 to be operated at variable speed in synchronization with the alternating current on the transmission lines 31 and 32.

On the other hand, the current in the secondary circuit of the induction generator-motor 35 is sensed by a secondary current sensor 45 provided for each of the three phases of the secondary circuit 40. An excess current sensor 46 provided for the variable speed controller 41 senses that the value of the current has exceeded a preset value (or the current excess current has made excess current).

A neutral point current sensor 52 provided at the neutral point of the main transformer 33 senses transmission line ground fault current 51. A ground excess current sensor 53 senses that the value of the transmission line ground fault current 51 has exceeded a preset value (or the ground fault current 51 has made excess current) and supplies a transmission line fault signal 54 to the variable speed controller 41.

On the transmission line 32 side, there are provided a transmission line protective device 47 and a transmission line protective device 48. When a transmission line fault has occurred, the transmission protective devices 47 and 48 close the breakers CB41, CB42 again. If the ground fault at the transmission line fault point 49 is transient and lasts for a short time, an attempt is made to restore the transmission line to normal conditions. If the ground fault at the transmission line fault point 49 has lasted for a long time, the breakers CB41, CB42 are tripped to isolate the fault point 49 from the transmission line 32. As a result of those actions, the transmission line 2 is kept in good condition (although not shown, the same holds true for the transmission 31 side).

The variable speed controller 41 is provided with the following functions:

A judging function of judging whether a fault occurred in the transmission line 32 is allowed to continue or remedied, on the basis of the transmission line fault signal 54 from the ground excess current sensor 53.

A control function of conducting or cutting off the current in the secondary current 40 of the induction generator-motor 53 by activating and deactivating the power inverter control signal 44 on the basis of the result of sensing excess current at the excess current sensor 46 and the result of the judgment by the judging function.

The function of outputting a generator trip signal 50 to the induction generator-motor 42 controlling the parallel breaker 34 and exciting power supply breaker 36, when it has been judged that a fault has occurred in the secondary circuit 40 of the induction generator-motor 53, on the basis of the result of sensing excess current at the excess current sensor 46 and the result of sensing excess current at the ground excess current sensor 53.

Hereinafter, an operation control method in the operation controller for the variable speed gearing constructed as described above will be explained.

In FIG. 1, the induction generator-motor 35 is connected to the transmission line 31 and transmission line 32 via the parallel breaker 34, disconnectors DS61, DS62, main transformer 33, breaker CB5, breakers CB31, CB32 and breakers CB41, CB42 in that order.

The secondary exciting current of the induction generator-motor 35 is inputted to the power rectifier 38 via the exciting power supply breaker 36 and exciting transformer 37. The power rectifier 38 converts the alternating current into a direct current in the presence of a power rectifier control signal 43 from the variable speed controller. The direct current is inputted to the power inverter 39.

The power inverter 39 converts the direct current into an alternating current of variable frequency in the presence of a power inverter control signal 44 from the variable speed controller 41. The resulting alternating current is supplied to the secondary circuit 40 of the induction generator-motor 35, thereby operating the induction generator-motor 25 at variable speed in synchronization with the alternating current on the transmission lines 31 and 32.

In this state, when a transmission line fault, such as a one-line ground or a three-line ground, has occurred at a fault point 49 in the transmission line 32, the induction generator-motor 35 supplies a fault current to the fault point 49. As a result, the fault current flows into the primary circuit of the induction generator-motor 35, inducing electromotive force in the secondary winding of the induction generator-motor 35.

Figure 9:
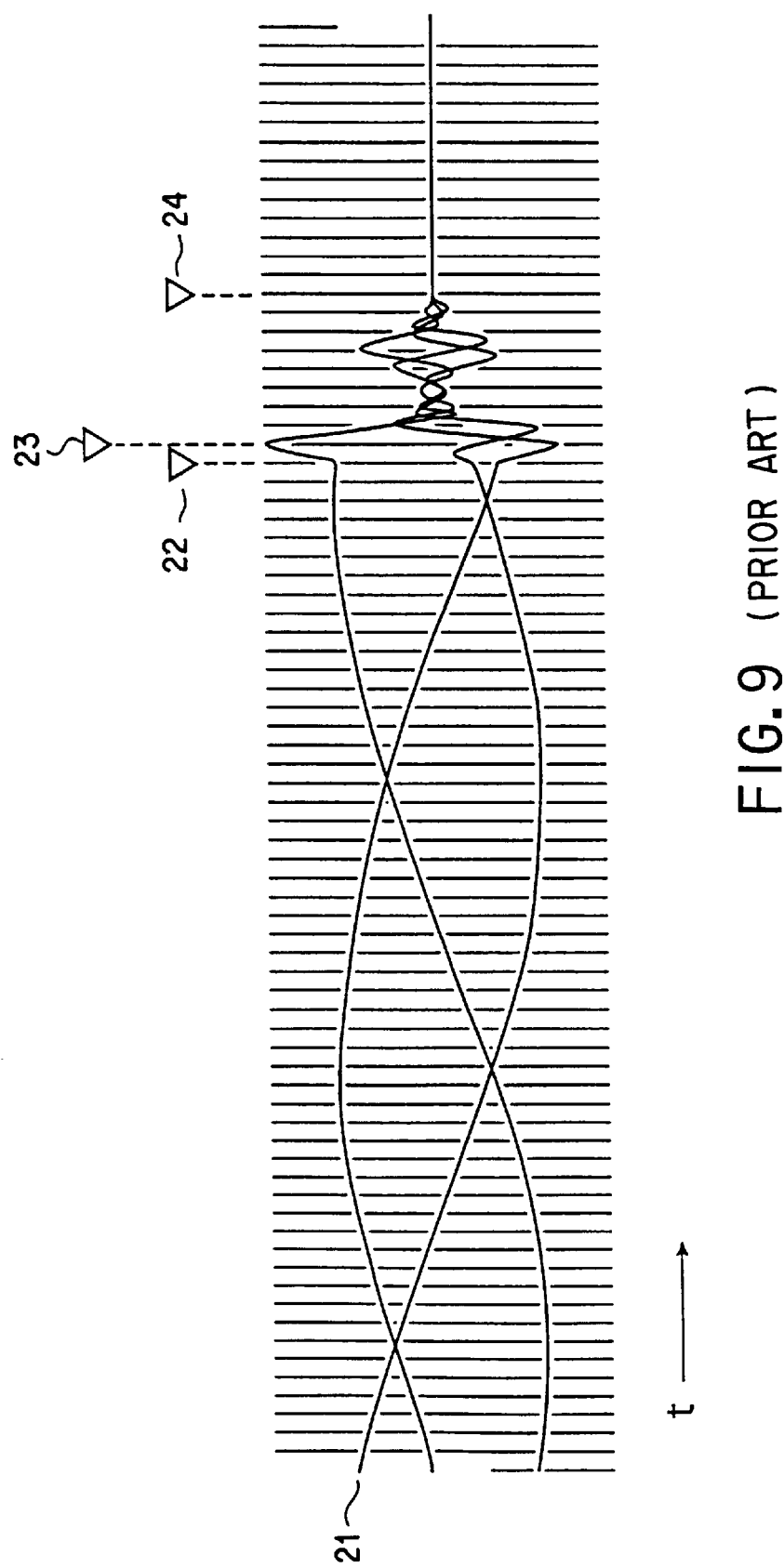
FIG. 9 shows an example of a current waveform in the secondary circuit of an induction generator-motor when a fault has occurred in a transmission line.

Then, the balance of the three-phase current in the secondary circuit 40 of the induction generator-motor 35 is lost because of the induced voltage in the secondary circuit 40. As a result, current whose waveform is similar to the secondary current waveform as shown in FIG. 9 flows in the secondary circuit 40.

The current in the secondary circuit 40 of the induction generator-motor 35 is sensed by a secondary current sensor 45 provided for each of the three phases of the secondary circuit 40. When the sensor 45 has sensed that the value preset at the excess current sensor 46 has been exceeded, the excess current sensor 46 starts to operate.

On the other hand, when a fault has occurred in the transmission line, the transmission line protective devices 47 and 48 operate on the transmission line 32 side to close the breakers CB41, CB42 in the transmission line 32 again, trying to restore the transmission line 32 to normal conditions.

When the ground fault at the fault point is transient and has lasted for a short time, the re-closing of the circuit is successful, restoring the transmission line 32 to the state before the fault occurred. When the ground fault at the fault point 49 has lasted for a long time, the re-closed circuit is broken finally, tripping the breakers CB41, CB42 at both ends of the transmission line fault point 49 to disconnect the fault point 49 from the transmission line 32, which keeps the transmission line 32 in good condition.

The ground fault current 51 flowing from the fault point 49 through the transmission line 32 passes through the ground, the neutral point of the main transformer 33, the main transformer 33 serving as a power supply, and the transmission line 32 and returns to the fault point 49. The ground, the neutral point of the main transformer 33, the main transformer 33, the transmission line 32, and the fault point 49 form a closed circuit.

Then, the ground fault current 51 is sensed by the neutral point current sensor 52 provided at the neutral point of the main transformer 33 and is inputted to the ground excess current sensor 53.

The ground excess current sensor 53 operates when the value of the ground fault current 51 has exceeded a preset value and outputs a transmission line fault signal 54 to the variable speed controller 41.

Figure 2:
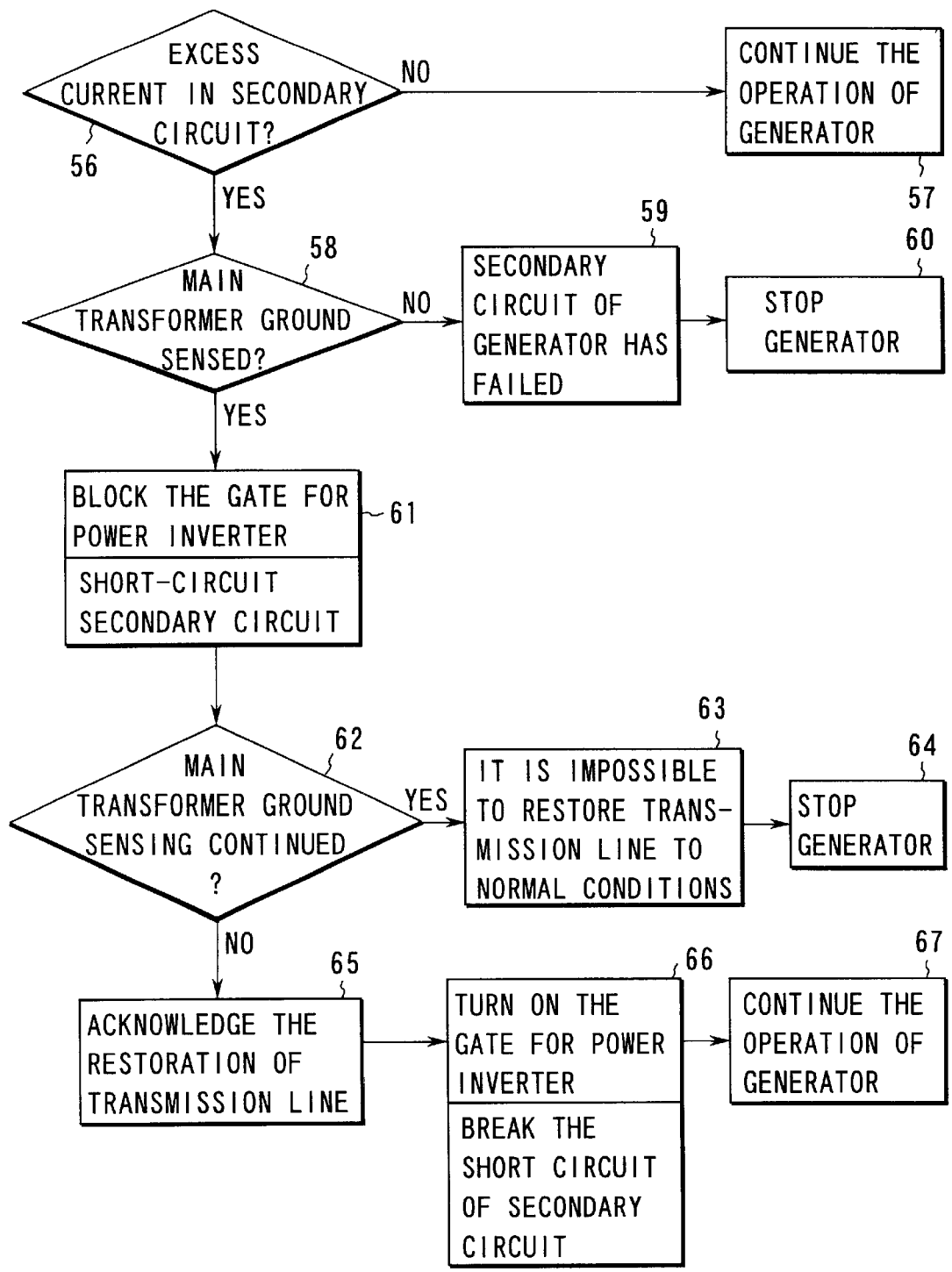
FIG. 2 is a flowchart to help explain an operation control method in the operation controller of the first embodiment.

The variable speed controller 41, receiving the input signal, performs control according to a flowchart as shown in FIG. 2.

Specifically, in FIG. 2, secondary circuit excess current judging logic 56 judges whether or not the secondary circuit 40 of the induction generator-motor 35 in operation is in the excess current state.

If the result of the judgment has shown that the excess current sensor 46 is not in operation, generator operation control 57 continues the operation of the induction generator-motor 35. If the result has shown that the excess current sensor 46 is in operation, transmission line fault judging logic 58 is performed.

On the other hand, if the ground excess current sensor 53 of the main transformer 33 is not in operation, with the excess current sensor 46 in operation, the transmission line fault judging logic 58 establishes secondary circuit fault judgment 59, instead of judging that a fault has occurred in the transmission line.

When the secondary circuit fault judgment 59 has been made, generator stop control 60 causes the variable speed controller 41 to output a generator trip signal 50 to the generator controller 42, thereby stopping the operation of the induction generator-motor 35.

If the ground excess current sensor 53 of the main transformer 33 is in operation, with the excess current sensor 46 in operation, the transmission line judging logic 58 judges that a fault has occurred in the transmission line 31 or 32, and performs secondary current cutoff control 61.

In the secondary current cutoff control 61, the power rectifier 38 maintains the rectifying function in the presence of the power rectifier control signal 43 and cuts off the power inverter control signal 44, thereby stopping the conversion control of the power inverter 39, which cuts off the supply of current from the exciting transformer 37 serving as an exciting power supply to the secondary circuit 40 of the induction generator-motor 35.

To deal with a fault current induced in the secondary circuit 40 of the induction generator-motor 35 due to a fault in the transmission line, a short circuit for the secondary circuit 40 of the induction generator-motor 35 is composed of regenerative diodes (not shown) constituting the power inverter 39. This not only prevents overvoltage from developing in the secondary circuit 40 of the induction generator-motor 35, but also causes the snubber capacitor (not shown) or the direct-current capacitor of the direct-current circuit (not shown) constituting the power inverter 39 to charge the fault current, thereby attenuating the fault current.

On the other hand, the execution of the secondary current cutoff control 61 causes the current in the secondary circuit 40 of the induction generator-motor 35 to disappear. The rotor of the induction generator-motor 35 including the secondary winding, however, is rotated by a prime mover (not shown), such as a waterwheel, directly connected to the induction generator-motor 35 and continues the operation.

Since the induction generator-motor 35 is operated at variable speed, the conversion control of the power inverter 39 is started to supply an exciting current of variable speed frequency to the secondary circuit 40 of the induction generator-motor 35, unless the rotation speed of the rotor of the induction generator-motor 35 departs from the variable speed range. This produces a state where the induction generator-motor 35 can be returned to operation synchronizing with the alternating current on the transmission lines 31, 32.

On the other hand, when the restoration of the transmission line 32 by the transmission line protective devices 47, 48 remedies the transmission line fault, when the fault point 49 is removed and connection is established so that only the transmission line 31 may be used, or when the secondary current cutoff at the secondary circuit 40 of the induction generator-motor 35 reduces the voltage of the induction generator-motor 35 to zero, the transmission line ground fault current 51 is prevented from flowing. When the fault continues for a very long time, the fault current 51 flows each time a voltage is applied to the transmission line 32.

When the fault in the transmission line 32 continues, because the transmission line fault signal 54 holds the established state, transmission line ground fault continue judging logic 62 judges that it is impossible to restore the transmission line 32 to normal conditions, establishes transmission line restoration impossible judgment 63, and causes generator stop control 64 to stop the operation of the induction generator-motor 35.

Then, when the ground fault current 51 stops flowing in the neutral point current sensor 52, the ground excess current sensor 53 is returned to the original condition, making the transmission line fault signal 54 unestablished. From this state, the transmission line ground fault continue judging logic 62 judges that the fault has been corrected, and establishes transmission line restoration judgment 65.

After the transmission line restoration judgment 65 has been established, the variable speed controller 41 performs secondary current restart control 66.

In the secondary current restart control 66, the power inverter control signal 44 is conducted to restart the conversion control of the power inverter 39, thereby converting the direct current from the power rectifier 38 into an alternating current of variable frequency and supplying a secondary current to the secondary circuit 40 of the induction generator-motor 35. At the same time, the operation of the induction generator-motor 35 is continued by generator operation control 67.

As a result of the restart of the conversion control of the power inverter 39, the exciting transformer 37 acting as an exciting power supply supplies current to the secondary circuit 40 via the power rectifier 38 and power inverter 39. At the same time, a reverse voltage is applied to the regenerative diode (not shown) of the power inverter 39, thereby breaking the short circuit of the secondary circuit 40. The regenerative diode is a circuit that allows the fault current induced in the secondary circuit 40 of the induction generator-motor 35 to flow.

As described above, with the first embodiment, when a fault has occurred at a fault point 49 in the transmission line 32, excess current flows in the secondary circuit 40 of the induction generator-motor 35, operating the excess current sensor 46. The operation of the excess current sensor 46 stops the conversion control of the power inverter 39, which not only cuts off the current in the secondary circuit 40 of the induction generator-motor 35, but also prevents overvoltage from developing due to the fault current.

The transmission line fault signal 54 from the ground excess current sensor 53 of the main transformer 33 which operates at the same time when a fault occurs in the transmission line makes it possible not only to judge whether or not the fault has occurred in the transmission line but also to continue the operation of the induction generator-motor 35. In addition, use of the fault signal 54 enables the conversion control of the power inverter 39 after the restoration of the transmission line to normal conditions or the separation of the faulty part, thereby restoring the induction generator-motor 35 to its original operating condition.

As described above, even when a fault, such as a one-line ground or a three-line ground, has occurred in the transmission line and excess current has developed in the secondary circuit 40 of the induction generator-motor 35, the induction generator-motor 35 can be operated in such a manner that the operating state of the induction generator-motor 35 is maintained and the power shortage at the time of transmission line fault is compensated for, which prevents the power on the transmission line from fluctuating and improves the reliability of the power generation facilities.

Since a fault in the transmission line can be sensed directly, it is possible to make the accuracy and probability of sensing very high.

(Second Embodiment)

Figure 3:
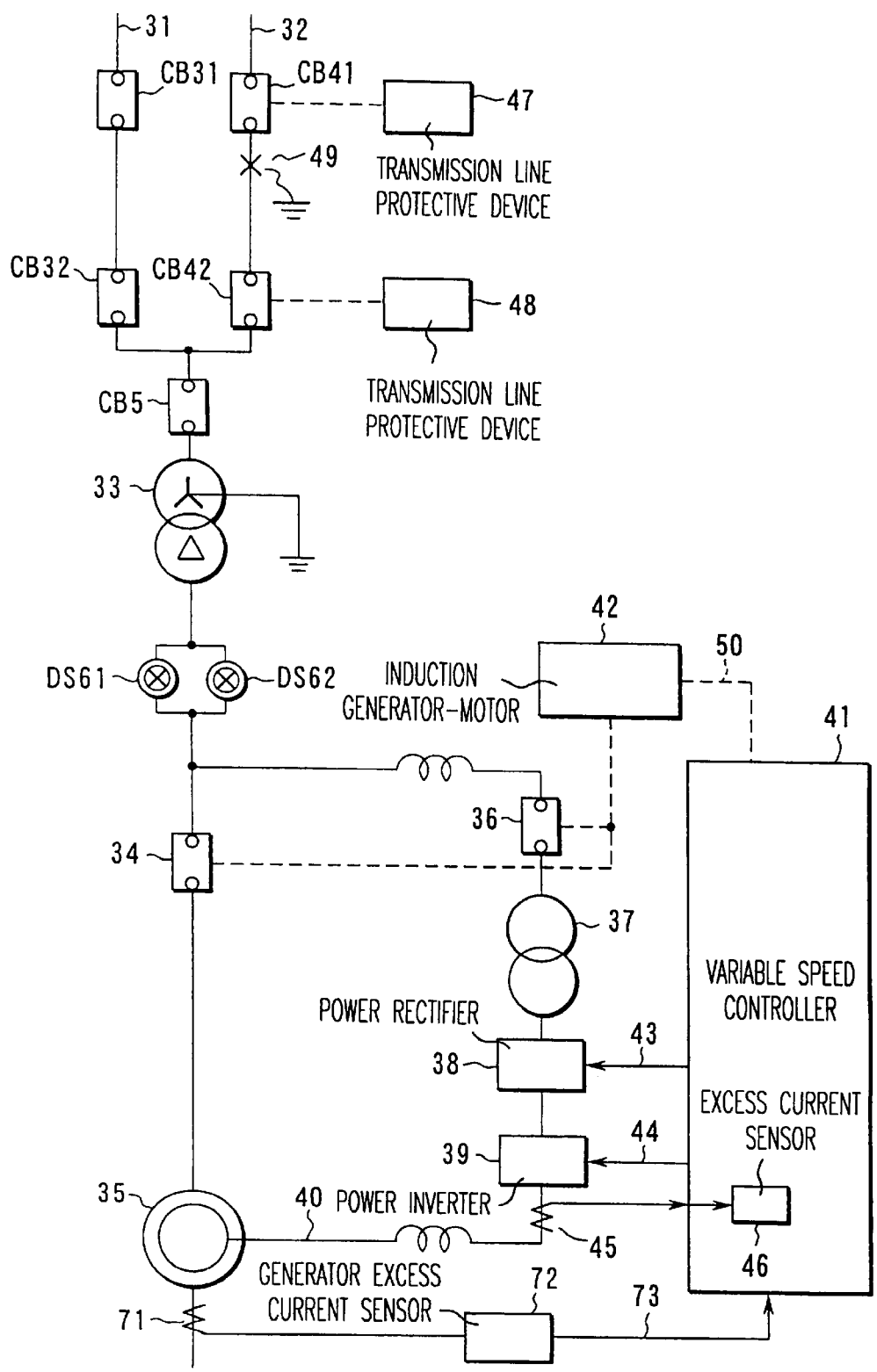
FIG. 3 is a block diagram of an operation controller for a variable speed gearing according to a second embodiment of the present invention.

FIG. 3 schematically shows an example of the configuration of an operation control apparatus for a variable speed gearing according to a second embodiment of the present invention. The same parts as those in FIG. 1 are indicated by the same reference symbols and explanation of them will be omitted. Only the parts differing from those in FIG. 1 will be explained.

The operation control apparatus for the variable speed gearing according to the second embodiment eliminates the following structure: in the structure, a neutral point current sensor 52 provided at the neutral point of the main transformer 33 senses a transmission line ground fault current 51, and a ground excess current sensor 53 senses that the value of the transmission line ground fault current 51 has exceeded a preset value (or the ground fault current 51 has made excess current) and supplies a transmission line fault signal 54 to the variable speed controller 41. In place of that structure, the operation control apparatus is provided with the following structure: in the structure, a generator current sensor 71 provided in each phase of the primary circuit of the induction generator-motor 35 senses a fault current (current in the primary circuit of the induction generator-motor 35) flowing toward the fault point 49 on the transmission line, and a generator excess current sensor 72 senses that the value of the fault current has exceeded a preset value (or the fault current has made excess current) and supplies a generator excess current signal 73 to the variable speed controller 41.

The variable speed controller 41 is provided with the following functions:

A judging function of judging whether a fault occurred in the transmission line 32 is allowed to continue or remedied, on the basis of the generator excess current signal 73 from the generator excess current sensor 72.

A control function of conducting or cutting off the current in the secondary current 40 of the induction generator-motor 35 by activating and deactivating the power inverter control signal 44 on the basis of the result of sensing excess current at the excess current sensor 46 and the result of the judgment by the judging function.

The function of outputting a generator trip signal 50 to the generator controller 42 for controlling the parallel breaker 34 and exciting power supply breaker 36, when it has been judged that a fault has occurred in the secondary circuit 40 of the induction generator-motor 35, on the basis of the result of sensing excess current at the excess current sensor 46 and the result of sensing excess current at the generator excess current sensor 72.

Hereinafter, an operation control method in the operation controller for the variable speed gearing constructed as described above will be explained.

In FIG. 3, the induction generator-motor 35 is connected to the transmission line 31 and transmission line 32 via the parallel breaker 34, disconnectors DS61, DS62, main transformer 33, breaker CB5, breakers CB31, CB32 and breakers CB41, CB42 in that order.

The secondary exciting current of the induction generator-motor 35 is inputted to the power rectifier 38 via the exciting power supply breaker 36 and exciting transformer 37. The power rectifier 38 converts the alternating current into a direct current in the presence of a power rectifier control signal 43 from the variable speed controller 41. The direct current is inputted to the power inverter 39.

The power inverter 39 converts the direct current into an alternating current of variable frequency in the presence of a power inverter control signal 44 from the variable speed controller 41. The resulting alternating current is supplied to the secondary circuit 40 of the induction generator-motor 35, thereby operating the induction generator-motor 35 at variable speed in synchronization with the alternating current on the transmission lines 31 and 32.

In this state, when a fault, such as a one-line ground or a three-line ground, has occurred at a fault point 49 in the transmission line 32, the induction generator-motor 35 supplies a fault current to the fault point 49. As a result, the fault current flows into the primary circuit of the induction generator-motor 35, inducing electromotive force in the secondary winding of the induction generator-motor 35.

Then, the balance of the three-phase current in the secondary circuit 40 of the induction generator-motor 35 is lost because of the induced voltage in the secondary circuit 40. As a result, current whose waveform is similar to the secondary current waveform as shown in FIG. 9 flows in the secondary circuit 40.

The current in the secondary circuit 40 of the induction generator-motor 35 is sensed by a secondary current sensor 45 provided for each of the three phases of the secondary circuit 40. When the sensor 45 has sensed that the value preset at an excess current sensor 46 has been exceeded, the excess current sensor 46 starts to operate.

On the other hand, when a fault has occurred in the transmission line, the transmission line protective devices 47 and 48 operate on the transmission line 32 side to close the breakers CB41, CB42 in the transmission line 32 again, trying to restore the transmission line 32 to normal conditions.

When the ground fault at the fault point 49 is transient and has lasted for a short time, the re-closing of the breakers is successful, restoring the transmission line 32 to the state before the fault occurred. When the ground fault at the fault point 49 has lasted for a long time, the re-closed circuit is broken finally, tripping the breakers CB41, CB42 at both ends of the transmission line fault point 49 to disconnect the fault point 49 from the transmission line 32, which keeps the transmission line 32 in good condition.

In addition, a fault current flows from the induction generator-motor 35 through the parallel breaker 34 and main transformer 33 to the fault point 49.

Then, the fault current is sensed by the generator current sensor 71 provided for each of the phases of the primary circuit of the induction generator-motor 35 and inputted to the generator excess current sensor 72.

The generator excess current sensor 72 operates when the value of the fault current has exceeded a preset value and outputs a generator excess current signal 73 to the variable speed controller 41.

Figure 4:
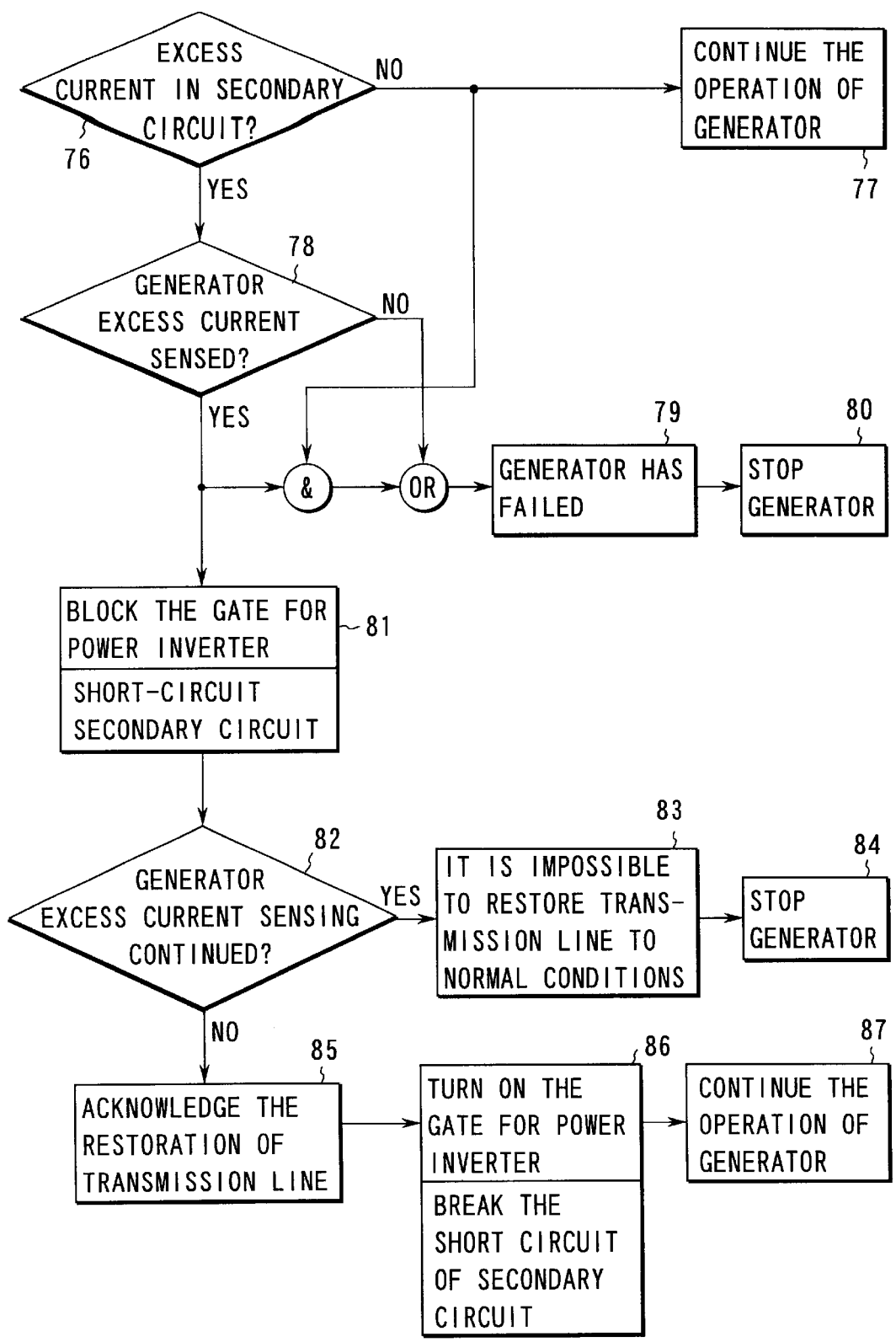
FIG. 4 is a flowchart to help explain an operation control method in the operation controller of the second embodiment.

The variable speed controller 41, receiving the input signal, performs control according to a flowchart as shown in FIG. 4.

In FIG. 4, secondary circuit excess current judging logic 76 judges whether or not the secondary circuit 40 of the induction generator-motor 35 in operation is in the excess current state.

If the result of the judgment has shown that the excess current sensor 46 is not in operation, generator operation control 77 continues the operation of the induction generator-motor 35. If the result has shown that the excess current sensor 46 is in operation, generator excess current judging logic 78 is performed.

On the other hand, if the generator excess current sensor 72 of the induction generator-motor 35 is not in operation, with the excess current sensor 46 in operation, or when only the generator excess current sensor 72 operates, with the excess current sensor out of operation, the generator excess current judging logic 78 judges that a fault has occurred in the induction generator-motor 35, and makes a generator fault judgment 79.

When the generator fault judgment 79 has been made, generator stop control 80 causes the variable speed controller 41 to output a generator trip signal 50 to the generator controller 42, thereby stopping the operation of the induction generator-motor 35.

If the generator excess current sensor 72 of the induction generator-motor 35 is in operation, with the excess current sensor 46 in operation, the generator excess current judging logic 78 judges that a fault has occurred in the transmission line 31 or 32, and performs secondary current cutoff control 81.

In the secondary current cutoff control 81, the power rectifier 38 maintains the rectifying function in the presence of the power rectifier control signal 43 and cuts off the power inverter control signal 44, thereby stopping the conversion control of the power inverter 39, which cuts off the supply of current from the exciting transformer 37 serving as an exciting power supply to the secondary circuit 40 of the induction generator-motor 35.

To deal with a fault current induced in the secondary circuit 40 of the induction generator-motor 35 due to a fault in the transmission line, a short circuit for the secondary circuit 40 is composed of regenerative diodes (not shown) constituting the power inverter 39. This not only prevents overvoltage from developing in the secondary circuit 40, but also causes the snubber capacitor (not shown) or the direct-current capacitor of the direct-current circuit (not shown) constituting the power inverter 39 to charge the fault current, thereby attenuating the fault current.

On the other hand, the execution of the secondary current cutoff control 81 causes the current in the secondary circuit 40 of the induction generator-motor 35 to disappear. The rotor of the induction generator-motor 35 including the secondary winding, however, is rotated by a prime mover (not shown), such as a waterwheel, directly connected to the induction generator-motor 35 and continues the operation.

Since the induction generator-motor 35 is operated at variable speed, the conversion control of the power inverter 39 is started to supply an exciting current of variable speed frequency to the secondary circuit 40 of the induction generator-motor 35, unless the rotation speed of the rotor of the induction generator-motor 35 departs from the variable speed range. This produces a state where the induction generator-motor 35 can be returned to operation synchronizing with the alternating current on the transmission lines 31, 32.

On the other hand, when the restoration of the transmission line 32 by the transmission line protective devices 47, 48 has remedied the transmission line fault, when the fault point 49 has been removed and connection has been established so that only the transmission line 31 may be used, or when the secondary current cutoff in the secondary circuit 40 of the induction generator-motor 35 has reduced the voltage of the induction generator-motor 35 to zero, the transmission line ground fault current 51 is prevented from flowing.

When the fault continues for a very long time, the transmission line ground fault current 51 flows each time a voltage is applied to the transmission line 32. As a result, the balance of the phase current in the induction generator-motor 35 that supplies a fault current is lost, resulting in excess current.

When the fault in the transmission line 32 continues, because the generator excess current signal 73 keeps the established state, transmission line ground fault continue judging logic 82 judges that it is impossible to restore the transmission line 32 to normal conditions, establishes transmission line restoration impossible judgment 83, and causes generator stop control 84 to stop the operation of the induction generator-motor 35.

Then, when the primary circuit of the induction generator-motor 35 has gone out of the excess current state, the generator excess current sensor 72 is returned to its original condition, making the generator excess current signal 73 unestablished. From this state, the transmission line ground fault continue judging logic 82 judges that the fault has been corrected, and establishes transmission line restoration judgment 85.

After the transmission line restoration judgment 85 has been established, the variable speed controller 41 performs secondary current restart control 86.

In the secondary current restart control 86, the power inverter control signal 44 is conducted to restart the conversion control of the power inverter 39, thereby converting the direct current from the power rectifier 38 into an alternating current of variable frequency and supplying a secondary current to the secondary circuit 40 of the induction generator-motor 35. At the same time, the operation of the induction generator-motor is continued by generator operation control 87.

As a result of the restart of the conversion control of the power inverter 39, the exciting transformer 37 acting as an exciting power supply supplies current to the secondary circuit 40 via the power rectifier 38 and power inverter 39. At the same time, a reverse voltage is applied to the regenerative diodes (not shown) of the power inverter 39, thereby breaking the short circuit of the secondary circuit 40. The regenerative diode is a circuit that allows the fault current induced in the secondary circuit 40 of the induction generator-motor 35 to flow.

As described above, with the second embodiment, when a fault has occurred at a fault point 49 in the transmission line 32, excess current flows in the secondary circuit 40 of the induction generator-motor 35, operating the excess current sensor 46. The operation of the excess current sensor 46 stops the conversion control of the power inverter 39, which not only cuts off the current in the secondary circuit 40 of the induction generator-motor 35, but also prevents overvoltage in the secondary circuit 40 from developing due to the fault current.

The generator excess current signal 73 from the generator excess current sensor 72 of the induction generator-motor 35 which operates at the same time when a fault occurs in the transmission line makes it possible not only to judge whether or not the fault has occurred in the transmission line but also to continue the operation of the induction generator-motor 35. In addition, use of the generator excess current signal 73 enables the conversion control of the power inverter 39 after the restoration of the transmission line to normal conditions or the separation of the faulty part, thereby restoring the induction generator-motor 35 to its original operating condition.

As described above, even when a fault, such as a one-line ground or a three-line ground, has occurred in the transmission line and excess current has developed in the secondary circuit 40 of the induction generator-motor 35, the induction generator-motor 35 can be operated in such a manner that the operating state of the induction generator-motor 35 is maintained and the power shortage at the time of transmission line fault is compensated for, which prevents the power on the transmission line from fluctuating and improves the reliability of the power generation facilities.

Since a fault in the transmission line can be sensed indirectly by using the existing facilities (including the generator current sensor 71 and generator excess current sensor 72), there is no need to additionally prepare special facilities for sensing a fault in the transmission line.

(Third Embodiment)

Figure 5:
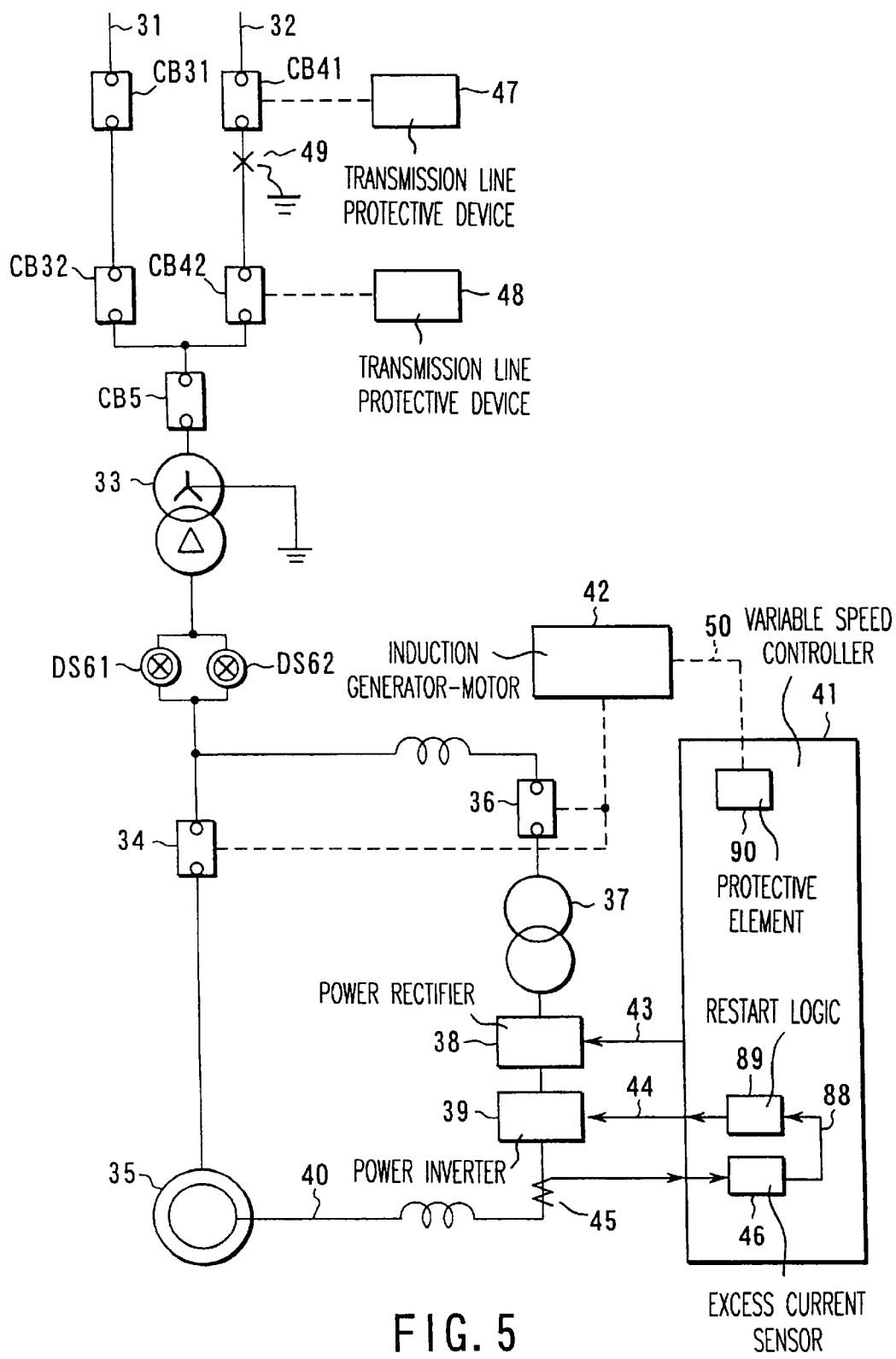
FIG. 5 is a block diagram of an operation controller for a variable speed gearing according to a third embodiment of the present invention.

FIG. 5 schematically shows an example of the configuration of an operation control apparatus for a variable speed gearing according to a third embodiment of the present invention. The same parts as those in FIG. 1 are indicated by the same reference symbols and explanation of them will be omitted. Only the parts differing from those in FIG. 1 will be explained.

The operation control apparatus for the variable speed gearing according to the third embodiment eliminates the following structure: in the structure, a neutral point current sensor 52 provided at the neutral point of the main transformer 33 senses a transmission line ground fault current 51, and a ground excess current sensor 53 senses that the value of the transmission line ground fault current 51 has exceeded a preset value (or the ground fault current 51 has made excess current) and supplies a transmission line fault signal 54 to the variable speed controller 41.

The variable speed controller 41 is provided with the following functions:

A current attenuation sensing function of sensing current attenuation by finding that the current value in the secondary circuit 40 of the induction generator-motor 35 has dropped below a preset value on the basis of a secondary current attenuation signal 88 from the excess current sensor 46.

A fault judging function for judging a fault in the induction generator-motor 35 by finding that restart logic 89 for making a restart by supplying a power inverter control signal 44 to the power inverter 39 and a protective element (e.g., an excess current sensing element, an overvoltage sensing element, or an insufficient voltage sensing element) 90 for sensing a fault in the induction generator-motor 35 except that the excess current sensor 46 senses excess current are in operation on the basis of the secondary current attenuation signal 88 from the excess current sensor 46.

A control function of conducting or cutting off the current in the secondary current 40 of the induction generator-motor 35 by activating and deactivating the power inverter control signal 44 on the basis of the result of sensing excess current at the excess current sensor 46, the result of sensing the current attenuation by the current attenuation sensing function, and the result of judgment by the fault judging function.

The function of outputting a generator trip signal 50 to the generator controller 42 for controlling the parallel breaker 34 and exciting power supply breaker 36, when it has been judged that a fault has occurred in the secondary circuit 40 of the induction generator-motor 35, on the basis of the fact that the protective element 90 is in operation.

Hereinafter, an operation control method in the operation controller for the variable speed gearing constructed as described above will be explained.

In FIG. 5, the induction generator-motor 35 is connected to the transmission line 31 and transmission line 32 via the parallel breaker 34, disconnectors DS61, DS62, main transformer 33, breaker CB5, breakers CB31, CB32 and breakers CB41, CB42 in that order.

The secondary exciting current of the induction generator-motor 35 is inputted to the power rectifier 38 via the exciting power supply breaker 36 and exciting transformer 37. The power rectifier 38 converts the alternating current into a direct current in the presence of a power rectifier control signal 43 from the variable speed controller 41. The direct current is inputted to the power inverter 39.

The power inverter 39 converts the direct current into an alternating current of variable frequency in the presence of a power inverter control signal 44 from the variable speed controller 41. The resulting alternating current is supplied to the secondary circuit 40 of the induction generator-motor 35, thereby operating the induction generator-motor 35 at variable speed in synchronization with the alternating current on the transmission lines 31 and 32.

In this state, when a fault, such as a one-line ground or a three-line ground, has occurred at a fault point 49 in the transmission line 32, the induction generator-motor 35 supplies a fault current to the fault point 49. As a result, the fault current flows into the primary circuit of the induction generator-motor 35, inducing electromotive force in the secondary winding of the induction generator-motor 35.

Then, the balance of the three-phase current in the secondary circuit 40 of the induction generator-motor 35 is lost because of the induced voltage in the secondary circuit 40. As a result, current whose waveform is similar to the secondary current waveform as shown in FIG. 9 flows in the secondary circuit 40.

The current in the secondary circuit 40 of the induction generator-motor 35 is sensed by a secondary current sensor 45 provided for each of the three phases of the secondary circuit 40. When the sensor 45 has sensed that the value preset at an excess current sensor 46 has been exceeded, the excess current sensor 46 starts to operate.

On the other hand, when a fault has occurred in the transmission line, the transmission line protective devices 47 and 48 operate on the transmission line 32 side to close the breakers CB41, CB42 in the transmission line 32 again, trying to restore the transmission line 32 to normal conditions.

When the ground fault at the fault point 49 is transient and has lasted for a short time, the re-closing of the breakers is successful, restoring the transmission line 32 to the state before the fault occurred. When the ground fault at the fault point 49 has lasted for a long time, the re-closed circuit is broken finally, tripping the breakers CB41, CB42 at both ends of the transmission line fault point 49 to disconnect the fault point 49 from the transmission line 32, which keeps the transmission line 32 in good condition.

Figure 6:
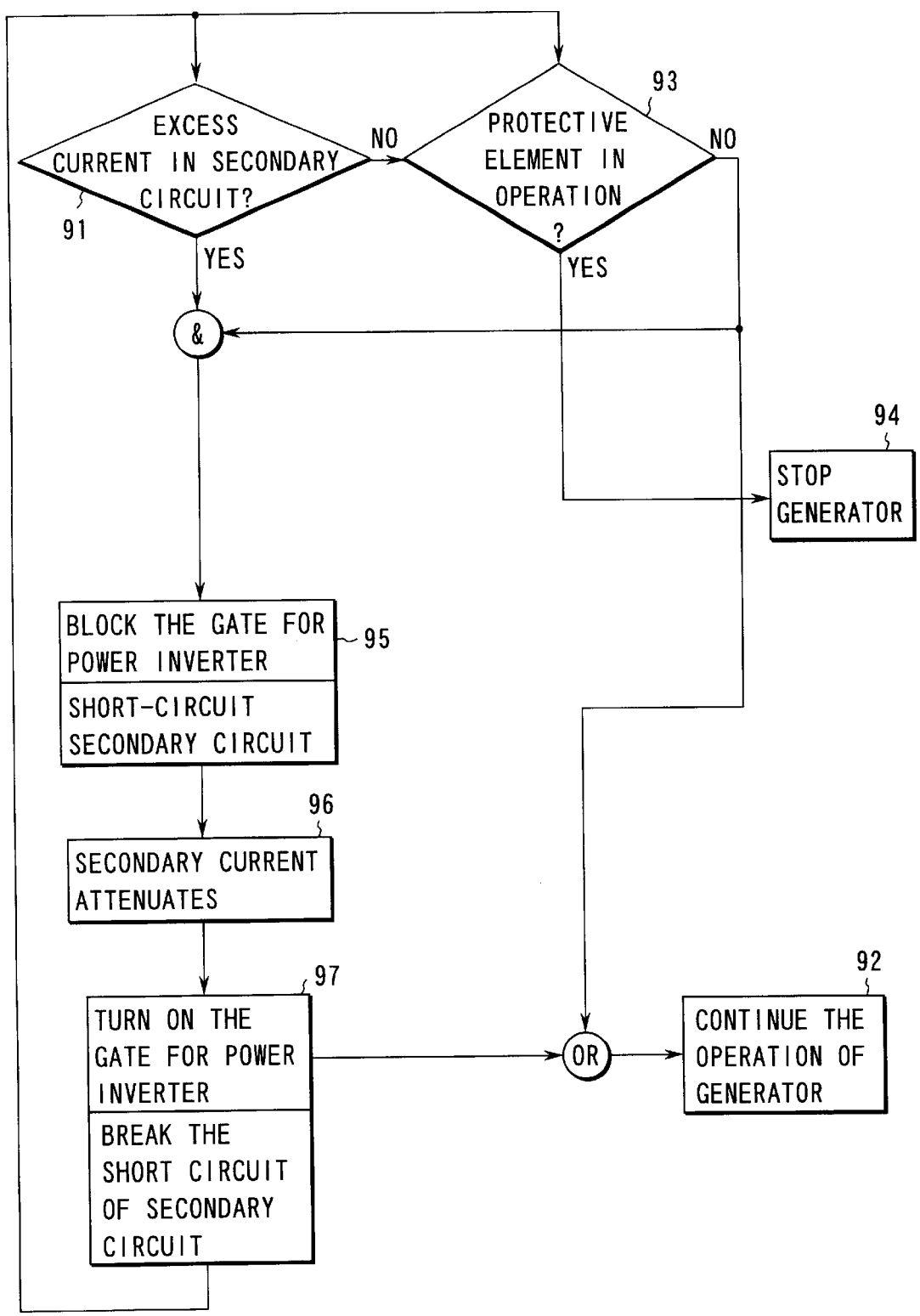
FIG. 6 is a flowchart to help explain an operation control method in the operation controller of the third embodiment.

The variable speed controller 41, receiving the input signal, performs control according to a flowchart as shown in FIG. 6.

In FIG. 6, when the protective element 90, a protective item other than the excess current sensor 46 in the secondary circuit 40 of the induction generator-motor 35, is in operation, protective element operation judging logic 93 judges that a fault has occurred in the induction generator-motor 35 and performs generator stop control 94, thereby stopping the induction generator-motor 35.

If neither the protective element 90 nor the excess current sensor 46 is in operation, generator operation control 92 continues the operation of the induction generator-motor 35 because no fault in the induction generator-motor 35 has been sensed.

If the protective element 90 is not in operation and only the excess current sensor 46 is in operation, secondary circuit excess current judging logic 91 judges that a fault has occurred in the transmission line 31 or 32 or in the induction generator-motor 35 and performs secondary current cutoff control 95.

In the secondary current cutoff control 95, the power rectifier 38 maintains the rectifying function in the presence of the power rectifier control signal 43 but cuts off the power inverter control signal 44, thereby stopping the conversion control of the power inverter 39, which prevents current from being supplied from the exciting transformer 37 acting as an exciting power supply to the secondary circuit 40 of the induction generator-motor 35.

To deal with a fault current induced in the secondary circuit 40 of the induction generator-motor 35 due to a fault in the transmission line, a short circuit for the secondary circuit 40 is composed of regenerative diodes (not shown) constituting the power inverter 39. This not only prevents overvoltage from developing in the secondary circuit 40, but also causes the snubber capacitor (not shown) or the direct-current capacitor (not shown) of the direct-current circuit constituting the power inverter 39 to charge the fault current, thereby attenuating the fault current.

On the other hand, the execution of the secondary current cutoff control 95 causes the current in the secondary circuit 40 of the induction generator-motor 35 to disappear. The rotor of the induction generator-motor 35 including the secondary winding, however, is rotated by a prime mover (not shown), such as a waterwheel, directly connected to the induction generator-motor 35 and continues the operation.

Since the induction generator-motor 35 is operated at variable speed, the conversion control of the power inverter 39 is started to supply an exciting current of variable frequency to the secondary circuit 40 of the induction generator-motor 35, unless the rotation speed of the rotor of the induction generator-motor 35 departs from the variable speed range. This produces a state where the induction generator-motor 35 can be returned to operation synchronizing with the alternating current on the transmission lines 31, 32.

Furthermore, in the secondary current cutoff control 95, when the current in the secondary circuit 40 of the induction generator-motor 35 attenuates and drops below the value preset at the excess current sensor 46, the excess current sensor 46 outputs a secondary current attenuation signal 88. After secondary current attenuation verify logic 96 has acknowledged the attenuation signal 88, secondary current restart control 97 is performed.

In the secondary current restart control 97, the power inverter control signal 44 is conducted to restart the conversion control of the power inverter 39. The power inverter 39 converts the direct current from the power rectifier 38 into an alternating current of variable frequency and supplies a secondary current to the secondary circuit 40 of the induction generator-motor 35. At the same time, the generator operation control 87 continues the operation of the induction generator-motor 35.

At this time, when the restoration of the transmission line 32 by the transmission line protective devices 47 and 48 has remedied the fault, or when the fault point 49 has been removed and a connection is made so that only the transmission line 31 may be used, the excess current sensor 46 in the secondary circuit 40 of the induction generator-motor 35 does not operate at restart and the generator operation control 92 continues the operation of the induction generator-motor 35.

When the excess current sensor 46 operates again at restart, it is judged that a fault has occurred in the transmission line 31 or 32 or in the induction generator-motor 35, and the secondary current cutoff control 95 is performed again, repeating restart.

As described above, with the third embodiment, when a fault has occurred at a fault point 49 in the transmission line 32, excess current flows in the secondary circuit 40 of the induction generator-motor 35, operating the excess current sensor 46. The operation of the excess current sensor 46 stops the conversion control of the power inverter 39, which not only cuts off the current in the secondary circuit 40 of the induction generator-motor 35, but also prevents overvoltage in the secondary circuit 40 from developing due to the fault current.

Since the protective element for the secondary circuit 40 of the induction generator-motor 35 other than the excess current sensor 46 is included in the protective element 90, the restart logic 89 restarts the power inverter 39 on the assumption that there is a high probability that the excess current sensor 46 that operates even when a fault has occurred in the transmission line senses a fault in the transmission. The restart of the power inverter 39 enables the operation of the induction generator-motor 35 to be continued. At the same time, the acknowledgment of the secondary current attenuation signal 88 enables conversion control of the power inverter 39 again after the restoration of the transmission line to normal conditions or the separation of the faulty part, thereby restoring the induction generator-motor 35 to its original condition.

As described above, even when a fault, such as a one-line ground or a three-line ground, has occurred in the transmission line and excess current has developed in the secondary circuit 40 of the induction generator-motor 35, the induction generator-motor 35 can be operated in such a manner that the operating state of the induction generator-motor 35 is maintained and the power shortage at the time of transmission line fault is compensated for, which prevents the power on the transmission line from fluctuating and improves the reliability of the power generation facilities.

Since a predictive judgment technique is used and the power inverter control signal 44 has only to be activated and deactivated, this improves the response characteristic and shortens the time required to restore the transmission line to normal conditions when a fault has occurred in the transmission line.

(Fourth Embodiment)

The configuration of an operation control apparatus for a variable speed gearing according to a fourth embodiment of the present invention is almost the same as that of the third embodiment. The same parts as those in FIG. 5 are indicated by the same reference symbols and explanation of them will be omitted. Only the parts differing from those in FIG. 5 will be explained.

In the operation control apparatus for the variable speed gearing according to the fourth embodiment, the variable speed controller 41 is provided with not only the functions the variable speed controller 41 of FIG. 5 has but also the following functions:

A storage function of storing the number of restarts of current in the secondary circuit 40 of the induction generator-motor 35.

A restart execute judging function of judging that it is impossible to remedy the fault, when the number of restarts stored by the storage function has exceeded a preset value.

A control function of conducting or cutting off the current in the secondary current 40 of the induction generator-motor 35 by activating and deactivating the power inverter control signal 44 on the basis of the result of sensing excess current at the excess current sensor 46, the result of sensing the current attenuation by the current attenuation sensing function, the result of judgment by the fault judging function, and the result of judgment by the restart execute judging function.

Hereinafter, an operation control method in the operation controller for the variable speed gearing constructed as described above will be explained.

In FIG. 5, the induction generator-motor 35 is connected to the transmission line 31 and transmission line 32 via the parallel breaker 34, disconnectors DS61, DS62, main transformer 33, breaker CB5, breakers CB31, CB32 and breakers CB41, CB42 in that order.

The secondary exciting current of the induction generator-motor 35 is inputted to the power rectifier 38 via the exciting power supply breaker 36 and exciting transformer 37. The power rectifier 38 converts the alternating current into a direct current in the presence of a power rectifier control signal 43 from the variable speed controller 41. The direct current is inputted to the power inverter 39.

The power inverter 39 converts the direct current into an alternating current of variable frequency in the presence of a power inverter control signal 44 from the variable speed controller 41. The resulting alternating current is supplied to the secondary circuit 40 of the induction generator-motor 35, thereby operating the induction generator-motor 35 at variable speed in synchronization with the alternating current on the transmission lines 31 and 32.

In this state, when a fault, such as a one-line ground or a three-line ground, has occurred at a fault point 49 in the transmission line 32, the induction generator-motor 35 supplies a fault current to the fault point 49. As a result, the fault current flows into the primary circuit of the induction generator-motor 35, inducing electromotive force in the secondary winding of the induction generator-motor 35.

Then, the balance of the three-phase current in the secondary circuit 40 of the induction generator-motor 35 is lost because of the induced voltage in the secondary circuit 40. As a result, current whose waveform is similar to the secondary current waveform as shown in FIG. 9 flows in the secondary circuit 40.

The current in the secondary circuit 40 of the induction generator-motor 35 is sensed by a secondary current sensor 45 provided for each of the three phases of the secondary circuit 40. When the sensor 45 has sensed that the value preset at an excess current sensor 46 has been exceeded, the excess current sensor 46 starts to operate.

On the other hand, when a fault has occurred in the transmission line, the transmission line protective devices 47 and 48 operate on the transmission line 32 side to close the breakers CB41, CB42 in the transmission line 32 again, trying to restore the transmission line 32 to normal conditions.

When the ground fault at the fault point 49 is transient and has lasted for a short time, the re-closing of the breakers is successful, restoring the transmission line 32 to the state before the fault occurred. When the ground fault at the fault point 49 has lasted for a long time, the re-closed circuit is broken finally, tripping the breakers CB41, CB42 at both ends of the transmission line fault point 49 to disconnect the fault point 49 from the transmission line 32, which keeps the transmission line in good condition.

Figure 7:
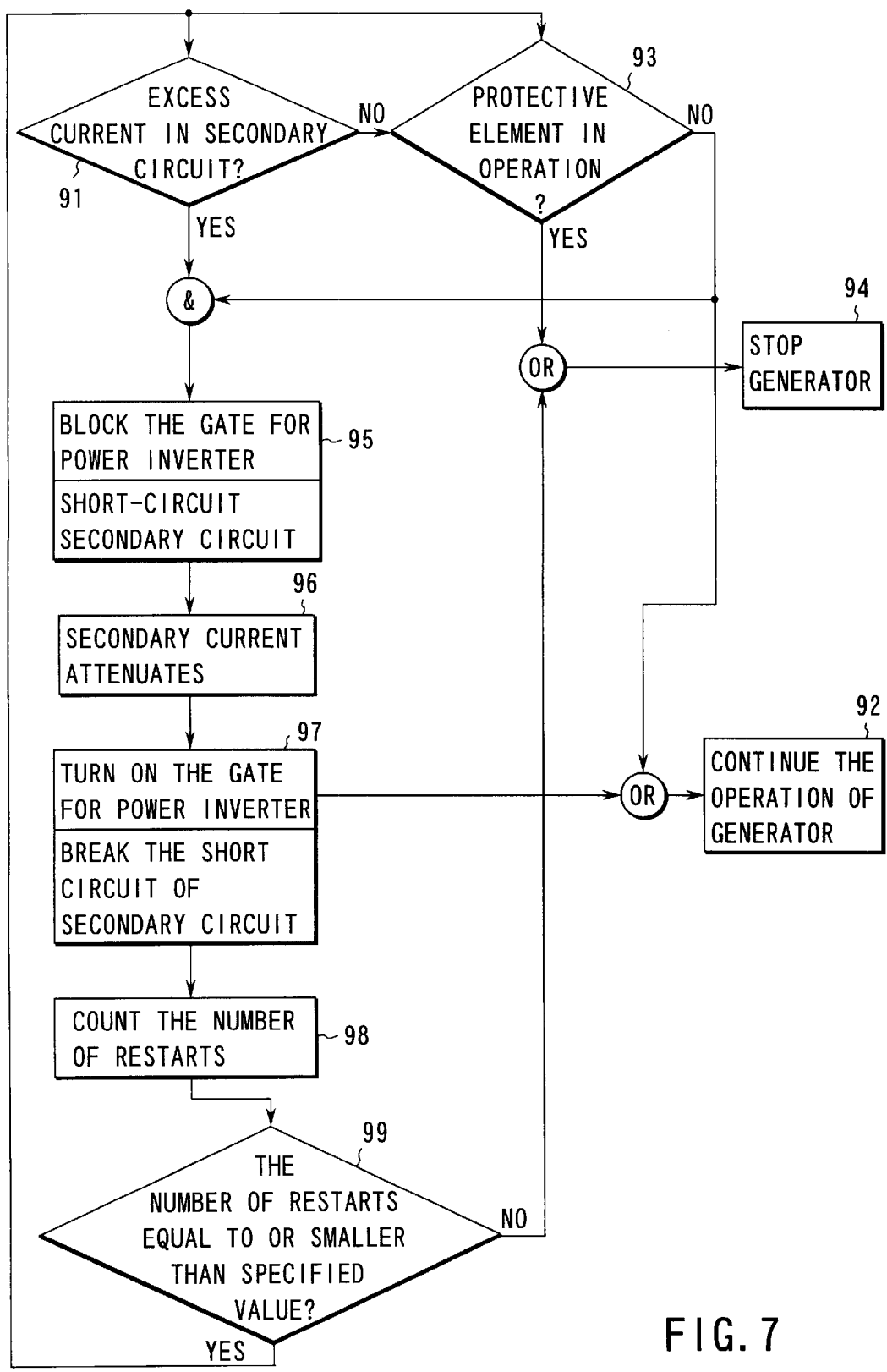
FIG. 7 is a flowchart to help explain an operation control method in an operation controller according to a fourth embodiment of the present invention.
Figure 8:
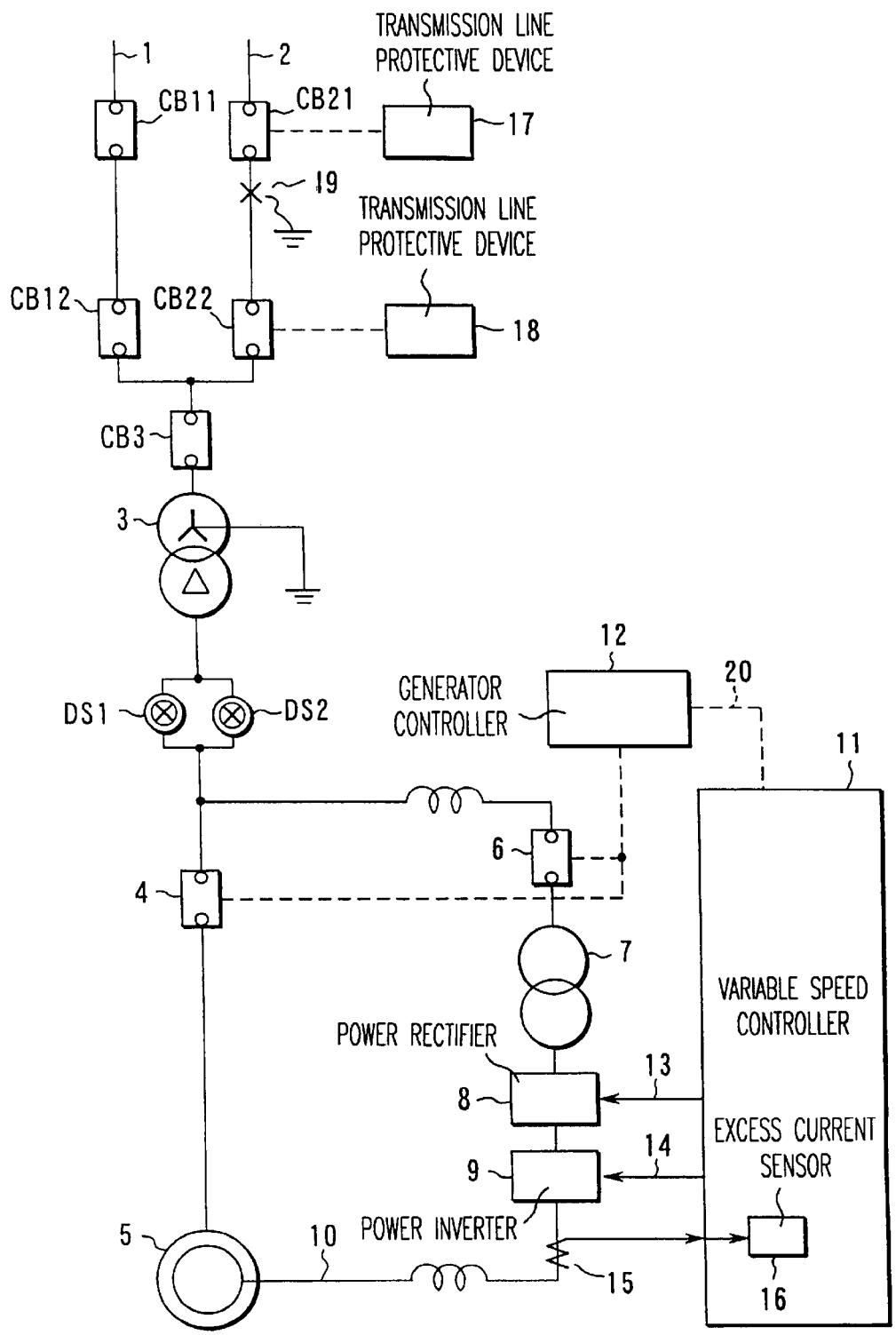
FIG. 8 is a block diagram of an operation controller for a conventional variable speed gearing.

The variable speed controller 41, receiving the input signal, performs control according to a flowchart as shown in FIG. 7.

In FIG. 7, when the protective element 90, a protective item other than the excess current sensor 46 in the secondary circuit 40 of the induction generator-motor 35, is in operation, protective element operation judging logic 93 judges that a fault has occurred in the induction generator-motor 35 and performs generator stop control 94, thereby stopping the induction generator-motor 35.

If neither the protective element 90 nor the excess current sensor 46 is in operation, generator operation control 92 continues the operation of the induction generator-motor 35 because no fault in the induction generator-motor 35 has been sensed.

If the protective element 90 is not in operation and only the excess current sensor 46 is in operation, secondary circuit excess current judging logic 91 judges that a fault has occurred in the transmission line 31 or 32 or in the induction generator-motor 35 and performs secondary current cutoff control 95.

In the secondary current cutoff control 95, the power rectifier 38 maintains the rectifying function in the presence of the power rectifier control signal 43, but cuts off the power inverter control signal 44, thereby stopping the conversion control of the power inverter 39, which prevents current from being supplied from the exciting transformer 37 acting as an exciting power supply to the secondary circuit 40 of the induction generator-motor 35.

To deal with a fault current induced in the secondary circuit 40 of the induction generator-motor 35 due to a fault in the transmission line, a short circuit for the secondary circuit 40 is composed of regenerative diodes (not shown) constituting the power inverter 39. This not only prevents overvoltage from developing in the secondary circuit 40, but also causes the snubber capacitor (not shown) or the direct-current capacitor (not shown) of the direct-current circuit constituting the power inverter 39 to charge the fault current, thereby attenuating the fault current.

On the other hand, the execution of the secondary current cutoff control 95 causes the current in the secondary circuit 40 of the induction generator-motor 35 to disappear. The rotor of the induction generator-motor 35 including the secondary winding, however, is rotated by a prime mover (not shown), such as a waterwheel, directly connected to the induction generator-motor 35 and continues the operation.

Since the induction generator-motor 35 is operated at variable speed, the conversion control of the power inverter 39 is started to supply an exciting current of variable speed frequency to the secondary circuit 40 of the induction generator-motor 35, unless the rotation speed of the rotor of the induction generator-motor 35 departs from the variable speed range. This produces a state where the induction generator-motor 35 can be returned to operation synchronizing with the alternating current on the transmission lines 31, 32.

Furthermore, in the secondary current cutoff control 95, when the current in the secondary circuit 40 of the induction generator-motor 35 attenuates and drops below the value preset at the excess current sensor 46, the excess current sensor 46 outputs a secondary current attenuation signal 88. After secondary current attenuation verify logic 96 has acknowledged the attenuation signal 88, secondary current restart control 97 is performed.

In the secondary current restart control 97, the power inverter control signal 44 is conducted to restart the conversion control of the power inverter 39. The power inverter 39 converts the direct current from the power rectifier 38 into an alternating current of variable frequency and supplies a secondary current to the secondary circuit 40 of the induction generator-motor 35. At the same time, the generator operation control 87 continues the operation of the induction generator-motor 35.

At this time, when the restoration of the transmission line 32 by the transmission line protective devices 47 and 48 has remedied the fault, or when the fault point 49 has been removed and a connection is made so that only the transmission line 31 may be used, the excess current sensor 46 in the secondary circuit 40 of the induction generator-motor 35 does not operate at restart and the generator operation control 92 continues the operation of the induction generator-motor 35.

When the excess current sensor 46 operates again at restart, it is judged that a fault has occurred in the transmission line 31 or 32 or in the induction generator-motor 35, and the secondary current cutoff control 95 is performed again, repeating restart.

Then, the number of restarts is counted by a restart counter 98. When restart enable judging logic 99 has judged that the count has exceeded a preset value, it is judged that it is impossible to remedy the fault. Then, the generator stop control 94 is executed, thereby stopping the induction generator-motor 35.

As described above, with the fourth embodiment, when a fault has occurred at a fault point 49 in the transmission line 32, excess current flows in the secondary circuit 40 of the induction generator-motor 35, operating the excess current sensor 46. The operation of the excess current sensor 46 stops the conversion control of the power inverter 39, which not only cuts off the current in the secondary circuit 40 of the induction generator-motor 35, but also prevents overvoltage in the secondary circuit 40 from developing due to the fault current.

Since the protective element for the secondary circuit 40 of the induction generator-motor 35 other than the excess current sensor 46 is included in the protective element 90, the restart logic 89 restarts the power inverter 39 on the assumption that there is a high probability that the excess current sensor 46 that operates even when a fault occurs in the transmission line senses a fault in the transmission. The restart of the power inverter 39 enables the operation of the induction generator-motor 35 to be continued. At the same time, the acknowledgment of the secondary current attenuation signal 88 enables conversion control of the power inverter 39 again after the restoration of the transmission line to normal conditions or the separation of the faulty part, thereby restoring the induction generator-motor 35 to its original condition.

Furthermore, since a decision to make a restart can be made on the basis of the number of restarts of current in the secondary circuit 40 of the induction generator-motor 35, the induction generator-motor 35 can be stopped automatically, if an uncorrectable fault has occurred in the transmission line.

As described above, even when a fault, such as a one-line ground or a three-line ground, has occurred in the transmission line and excess current has developed in the secondary circuit 40 of the induction generator-motor 35, the induction generator-motor 35 can be operated in such a manner that the operating state of the induction generator-motor 35 is maintained and the power shortage at the time of transmission line fault is compensated for, which prevents the power on the transmission line from fluctuating and improves the reliability of the power generation facilities.

Since a predictive judgment technique is used and the power inverter control signal 44 has only to be activated and deactivated, this improves the response characteristic and shortens the time required to restore the transmission line to normal conditions when a fault has occurred in the transmission line.

Furthermore, when it has been judged that the fault in the induction generator-motor 35 or in the transmission line cannot be removed and the operation of the induction generator-motor 35 is stopped, useless control of the current in the secondary circuit 40 of the induction generator-motor 35 is minimized, contributing to the reliability of the system.

(Fifth Embodiment)

In the first embodiment, the excess current sensor 46 has sensed excess current in the secondary circuit 40 of the induction generator-motor 35, provided that the value of current in the secondary circuit 40 of the induction generator-motor 35 has exceeded a preset value. In a fifth embodiment of the present invention, however, the excess current sensor 46 senses excess current in the secondary circuit, provided that the rate of change of the value of current in the secondary circuit 40 of the induction generator-motor 35 has exceeded a preset rate of change.

The fifth embodiment operates in the same manner as and produces the same effect as the first embodiment. In addition to this, since excess current in the secondary circuit 40 of the induction generator-motor 35 is sensed, provided that the rate of change of the value of current in the secondary circuit 40 of the induction generator-motor 35 has exceeded the preset rate of change, the response characteristic can be improved more than in the first embodiment.

(Sixth Embodiment)

In the second embodiment, the excess current sensor 46 has sensed excess current in the secondary circuit 40 of the induction generator-motor 35, provided that the value of current in the secondary circuit 40 of the induction generator-motor 35 has exceeded a preset value. In a sixth embodiment of the present invention, however, the excess current sensor 46 senses excess current in the secondary circuit, provided that the rate of change of the value of current in the secondary circuit 40 of the induction generator-motor 35 has exceeded a preset rate of change.

The sixth embodiment operates in the same manner as and produces the same effect as the second embodiment. In addition to this, since excess current in the secondary circuit 40 of the induction generator-motor 35 is sensed, provided that the rate of change of the value of current in the secondary circuit 40 of the induction generator-motor 35 has exceeded the preset rate of change, the response characteristic can be improved more than in the second embodiment.

(Seventh Embodiment)

In the third embodiment, the excess current sensor 46 has sensed excess current in the secondary circuit 40 of the induction generator-motor 35, provided that the value of current in the secondary circuit 40 of the induction generator-motor 35 has exceeded a preset value. In a seventh embodiment of the present invention, however, the excess current sensor 46 senses excess current in the secondary circuit, provided that the rate of change of the value of current in the secondary circuit 40 of the induction generator-motor 35 has exceeded a preset rate of change.

The seventh embodiment operates in the same manner as and produces the same effect as the third embodiment. In addition to this, since excess current in the secondary circuit 40 of the induction generator-motor 35 is sensed, provided that the rate of change of the value of current in the secondary circuit 40 of the induction generator-motor 35 has exceeded the preset rate of change, the response characteristic can be improved more than in the third embodiment.

(Eighth Embodiment)

In the fourth embodiment, the excess current sensor 46 has sensed excess current in the secondary circuit 40 of the induction generator-motor 35, provided that the value of current in the secondary circuit 40 of the induction generator-motor 35 has exceeded a preset value. In an eighth embodiment of the present invention, however, the excess current sensor 46 senses excess current in the secondary circuit, provided that the rate of change of the value of current in the secondary circuit 40 of the induction generator-motor 35 has exceeded a preset rate of change.

The eighth embodiment operates in the same manner as and produces the same effect as the fourth embodiment. In addition to this, since excess current in the secondary circuit 40 of the induction generator-motor 35 is sensed, provided that the rate of change of the value of current in the secondary circuit 40 of the induction generator-motor 35 has exceeded the preset rate of change, the response characteristic can be improved more than in the fourth embodiment.

(Ninth Embodiment)

In the first embodiment, the excess current sensor 46 has sensed excess current in the secondary circuit 40 of the induction generator-motor 35, provided that the value of current in the secondary circuit 40 of the induction generator-motor 35 has exceeded a preset value. In a ninth embodiment of the present invention, however, the excess current sensor 46 senses excess current in the secondary circuit, provided that the conversion instruction value signal (power inverter control signal 44) from the variable speed controller 41 to the power inverter 39 is converted into a signal corresponding to the secondary current in the secondary circuit 40 of the induction generator-motor 35, the value of the converted signal is constantly compared with the effective current value in the secondary circuit 40 of the induction generator-motor 35, and the deviation of the value of the converted signal from the effective current value has exceeded a preset value.

The ninth embodiment operates in the same manner as and produces the same effect as the first embodiment. In addition to this, since excess current in the secondary circuit 40 of the induction generator-motor 35 is sensed, provided that the value of the deviation of the signal value obtained by converting the conversion instruction value signal to the power inverter 39 into a value corresponding to the current in the secondary circuit 40 of the induction generator-motor 35 from the effective current value in the secondary circuit 40 of the induction generator-motor 35 has exceeded the preset value, a fault in the transmission can be sensed faster and more accurately than in the first embodiment.

(Tenth Embodiment)

In the second embodiment, the excess current sensor 46 has sensed excess current in the secondary circuit 40 of the induction generator-motor 35, provided that the value of current in the secondary circuit 40 of the induction generator-motor 35 has exceeded a preset value. In a tenth embodiment of the present invention, however, the excess current sensor 46 senses excess current in the secondary circuit, provided that the conversion instruction value signal (power inverter control signal 44) from the variable speed controller 41 to the power inverter 39 is converted into a signal corresponding to the secondary current in the secondary circuit 40 of the induction generator-motor 35, the value of the converted signal is constantly compared with the effective current value in the secondary circuit 40 of the induction generator-motor 35, and the deviation of the value of the converted signal from the effective current value has exceeded a preset value.

The tenth embodiment operates in the same manner as and produces the same effect as the second embodiment. In addition to this, since excess current in the secondary circuit 40 of the induction generator-motor 35 is sensed, provided that the value of the deviation of the signal value obtained by converting the conversion instruction value signal to the power inverter 39 into a value corresponding to the current in the secondary circuit 40 of the induction generator-motor 35 from the effective current value in the secondary circuit 40 of the induction generator-motor 35 has exceeded the preset value, a fault in the transmission can be sensed faster and more accurately than in the second embodiment.

(Eleventh Embodiment)

In the third embodiment, the excess current sensor 46 has sensed excess current in the secondary circuit 40 of the induction generator-motor 35, provided that the value of current in the secondary circuit 40 of the induction generator-motor 35 has exceeded a preset value. In an eleventh embodiment of the present invention, however, the excess current sensor 46 senses excess current in the secondary circuit, provided that the conversion instruction value signal (power inverter control signal 44) from the variable speed controller 41 to the power inverter 39 is converted into a signal corresponding to the secondary current in the secondary circuit 40 of the induction generator-motor 35, the value of the converted signal is constantly compared with the effective current value in the secondary circuit 40 of the induction generator-motor 35, and the deviation of the value of the converted signal from the effective current value has exceeded a preset value.

The eleventh embodiment operates in the same manner as and produces the same effect as the third embodiment. In addition to this, since excess current in the secondary circuit 40 of the induction generator-motor 35 is sensed, provided that the value of the deviation of the signal value obtained by converting the conversion instruction value signal to the power inverter 39 into a value corresponding to the current in the secondary circuit 40 of the induction generator-motor 35 from the effective current value in the secondary circuit 40 of the induction generator-motor 35 has exceeded the preset value, a fault in the transmission can be sensed faster and more accurately than in the third embodiment.

(Twelfth Embodiment)

In the fourth embodiment, the excess current sensor 46 has sensed excess current in the secondary circuit 40 of the induction generator-motor 35, provided that the value of current in the secondary circuit 40 of the induction generator-motor 35 has exceeded a preset value. In a twelfth embodiment of the present invention, however, the excess current sensor 46 senses excess current in the secondary circuit, provided that the conversion instruction value signal (power inverter control signal 44) from the variable speed controller 41 to the power inverter 39 is converted into a signal corresponding to the secondary current in the secondary circuit 40 of the induction generator-motor 35, the value of the converted signal is constantly compared with the effective current value in the secondary circuit 40 of the induction generator-motor 35, and the deviation of the value of the converted signal from the effective current value has exceeded a preset value.

The twelfth embodiment operates in the same manner as and produces the same effect as the fourth embodiment. In addition to this, since excess current in the secondary circuit 40 of the induction generator-motor 35 is sensed, provided that the value of the deviation of the signal value obtained by converting the conversion instruction value signal to the power inverter 39 into a value corresponding to the current in the secondary circuit 40 of the induction generator-motor 35 from the effective current value in the secondary circuit 40 of the induction generator-motor 35 has exceeded the preset value, a fault in the transmission can be sensed faster and more accurately than in the fourth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling the operation of a variable speed gearing, comprising:

the step of causing a power rectifier to convert an alternating current of a transmission line inputted via an exciting transformer into a direct current in the presence of a power rectifier control signal from a variable speed controller;

the step of causing a power inverter to convert said direct current into an alternating current of variable frequency in the presence of a power inverter control signal from said variable speed controller to produce a secondary exciting current;

the step of supplying said secondary exciting current to the secondary circuit of an induction generator-motor whose primary circuit is connected to said transmission line via at least a main transformer and thereby operating said induction generator-motor at variable speed in synchronization with the alternating current on said transmission line; and the step of, when excess current is sensed, provided that the current value in the secondary circuit of said induction generator-motor has exceeded a preset value, judging that excess current is in the secondary circuit of said induction generator-motor due to a fault in said transmission line, if excess current has been sensed, provided that the current value at the neutral point of said main transformer has exceeded a preset value, and continuing the operation of said induction generator-motor, or judging that a fault has occurred in the secondary circuit of said induction generator-motor, if excess current has not been sensed, provided that the current value at the neutral point of said main transformer has not exceeded the preset value, and stopping the operation of said induction generator-motor.

2. A method of controlling the operation of a variable speed gearing, comprising:

the step of causing a power rectifier to convert an alternating current of a transmission line inputted via an exciting transformer into a direct current in the presence of a power rectifier control signal from a variable speed controller;

the step of causing a power inverter to convert said direct current into an alternating current of variable frequency in the presence of a power inverter control signal from said variable speed controller to produce a secondary exciting current;

the step of supplying said secondary exciting current to the secondary circuit of an induction generator-motor whose primary circuit is connected to said transmission line via at least a main transformer and thereby operating said induction generator-motor at variable speed in synchronization with the alternating current on said transmission line; and the step of, when excess current is sensed, provided that the current value in the secondary circuit of said induction generator-motor has exceeded a preset value, judging that excess current is in the secondary circuit of said induction generator-motor due to a fault in said transmission line, if excess current has been sensed, provided that the current value in the primary circuit of said induction generator-motor has exceeded a preset value, and continuing the operation of said induction generator-motor, or judging that a fault has occurred in the secondary circuit of said induction generator-motor, if excess current has not been sensed, provided that the current value in the primary circuit of said induction generator-motor has not exceeded the preset value, and stopping the operation of said induction generator-motor.

3. A method of controlling the operation of a variable speed gearing, comprising:

the step of causing a power rectifier to convert an alternating current of a transmission line inputted via an exciting transformer into a direct current in the presence of a power rectifier control signal from a variable speed controller;

the step of causing a power inverter to convert said direct current into an alternating current of variable frequency in the presence of a power inverter control signal from said variable speed controller to produce a secondary exciting current;

the step of supplying said secondary exciting current to the secondary circuit of an induction generator-motor whose primary circuit is connected to said transmission line via at least a main transformer and thereby operating said induction generator-motor at variable speed in synchronization with the alternating current on said transmission line;

the step of cutting off the current in the secondary circuit of said induction generator-motor by blocking the power inverter control signal to said power inverter after excess current has been sensed, provided that the current value in the secondary circuit of said induction generator-motor has exceeded a preset value;

the step of continuing the operation of said induction generator-motor by reactivating the power inverter control signal to said power inverter by restart, if current attenuation has been sensed, provided that the current in the secondary circuit of said induction generator-motor has dropped below a preset value; and the step of judging that it is impossible to remove a fault in said induction generator-motor or in said transmission line, if a protective element other than the excess current sensing element in the secondary circuit of said induction generator-motor has operated during said restart, or if the number of times said restart was made has exceeded a preset value, and stopping the operation of said induction generator-motor.

4. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the current value has exceeded a preset value;

ground excess current sensing section configured to sense current at the neutral point of said main transformer and then sensing excess current, provided that the current value has exceeded a preset value;

a judging section configured to judge whether a fault occurred in said transmission line is allowed to continue or remedied, on the basis of the result of sensing excess current at said ground excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

5. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the current value has exceeded a preset value;

generator excess current sensing section configured to sense current in the primary circuit of said induction generator-motor and then sensing excess current, provided that the current value has exceeded a preset value;

a judging section configured to judge whether a fault occurred in said transmission line is allowed to continue or remedied, on the basis of the result of sensing excess current at said generator excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

6. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the current value has exceeded a preset value;

current attenuation sensing section configured to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, and the result of judgment at said fault judging section.

7. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the current value has exceeded a preset value;

current attenuation sensing section configured to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation;

restart execute judging section configured to store the number of restarts of current in the secondary circuit of said induction generator-motor and judging that it is impossible to remedy the fault, provided that the number of restarts has exceeded a preset value; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, the result of judgment at said fault judging section, and the result of judgment at said restart execute judging section.

8. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the rate of change of the current value has exceeded a preset rate of change;

ground excess current sensing section configured to sense current at the neutral point of said main transformer and then sensing excess current, provided that the current value has exceeded a preset value;

a judging section configured to judge whether a fault occurred in said transmission line is allowed to continue or remedied, on the basis of the result of sensing excess current at said ground excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

9. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the rate of change of the current value has exceeded a preset rate of change;

generator excess current sensing section configured to sense current in the primary circuit of said induction generator-motor and then sensing excess current, provided that the current value has exceeded a preset value;

a judging section configured to judge whether a fault occurred in said transmission line is allowed to continue or remedied, on the basis of the result of sensing excess current at said generator excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

10. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the rate of change of the current value has exceeded a preset rate of change;

current attenuation sensing section configured to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, and the result of judgment at said fault judging section.

11. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to sense the current in the secondary circuit of said induction generator-motor and then sensing excess current, provided that the rate of change of the current value has exceeded a preset rate of change;

current attenuation sensing section configured to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation;

restart execute judging section configured to store the number of restarts of current in the secondary circuit of said induction generator-motor and judging that it is impossible to remedy the fault, provided that the number of restarts has exceeded a preset value; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, the result of judgment at said fault judging section, and the result of judgment at said restart execute judging section.

12. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to convert a conversion instruction value signal to said power inverter into a signal corresponding to the secondary current in the secondary circuit of said induction generator-motor, comparing the value of the converted signal with the effective current value in the secondary circuit of said induction generator-motor, and then sensing excess current, provided that the deviation of the value of the converted signal from the effective current value has exceeded a preset value;

ground excess current sensing section configured to sense current at the neutral point of said main transformer and then sensing excess current, provided that the current value has exceeded a preset value;

a judging section configured to judge whether a fault occurred in said transmission line is allowed to continue or remedied, on the basis of the result of sensing excess current at said ground excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

13. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to convert a conversion instruction value signal to said power inverter into a signal corresponding to the secondary current in the secondary circuit of said induction generator-motor, comparing the value of the converted signal with the effective current value in the secondary circuit of said induction generator-motor, and then sensing excess current, provided that the deviation of the value of the converted signal from the effective current value has exceeded a preset value;

generator excess current sensing section configured to sense current in the primary circuit of said induction generator-motor and then sensing excess current, provided that the current value has exceeded a preset value;

a judging section configured to judge whether a fault occurred in said transmission line is allowed to continue or remedied, on the basis of the result of sensing excess current at said generator excess current sensing section; and a control section configured to conduct or cut off the current in the secondary circuit of said induction generator-motor by activating or deactivating a power inverter control signal from said variable speed controller on the basis of the result of sensing excess current at said secondary circuit excess current sensing section and the result of judgment at said judging section.

14. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to convert a conversion instruction value signal to said power inverter into a signal corresponding to the secondary current in the secondary circuit of said induction generator-motor, comparing the value of the converted signal with the effective current value in the secondary circuit of said induction generator-motor, and then sensing excess current, provided that the deviation of the value of the converted signal from the effective current value has exceeded a preset value;

current attenuation sensing section conferred to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, and the result of judgment at said fault judging section.

15. An apparatus for controlling the operation of a variable speed gearing, comprising:

a power rectifier configured to convert an alternating current of a transmission line inputted via an exciting transformer into a direct current in the presence of a power rectifier control signal from a variable speed controller;

a power inverter configured to convert said direct current into an alternating current of variable frequency in the presence of a power inverter control signal from said variable speed controller to produce a secondary exciting current;

a supplying section configured to supply said secondary exciting current to the secondary circuit of an induction generator-motor whose primary circuit is connected to said transmission line via at least a main transformer and thereby operating said induction generator-motor at variable speed in synchronization with the alternating current on said transmission line;

secondary circuit excess current sensing section configured to convert a conversion instruction value signal to said power inverter into a signal corresponding to the secondary current in the secondary circuit of said induction generator-motor, comparing the value of the converted signal with the effective current value in the secondary circuit of said induction generator-motor, and then sensing excess current, provided that the deviation of the value of the converted signal from the effective current value has exceeded a preset value;

current attenuation sensing section configured to sense current attenuation, provided that the current value in the secondary circuit of said induction generator-motor has dropped below a preset value;

fault judging section configured to judge that a fault has occurred in said induction generator-motor, provided that a protective element other than said secondary circuit excess current sensing section is in operation;

restart execute judging section configured to store the number of restarts of current in the secondary circuit of said induction generator-motor and judging that it is impossible to remedy the fault, provided that the number of restarts has exceeded a preset value; and a control section configured to conduct or cut off the current in the secondary circuit of said induction generator-motor by activating or deactivating a power inverter control signal from said variable speed controller on the basis of the result of sensing excess current at said secondary circuit excess current sensing section, the result of sensing current attenuation at said current attenuation sensing section, the result of judgment at said fault judging section, and the result of judgment at said restart execute judging section.

* * * * *